United States Patent
Baur et al.

(10) Patent No.: US 11,700,852 B2
(45) Date of Patent: Jul. 18, 2023

(54) AQUEOUS ELECTROLYTE-CONTAINING ADJUVANT COMPOSITIONS, ACTIVE INGREDIENT-CONTAINING COMPOSITIONS AND THE USE THEREOF

(71) Applicant: Clariant International Ltd., Muttenz (CH)

(72) Inventors: Peter Baur, Schondorf (DE); John Aponte, Grenzach-Wyhlen (DE); Gerd Schweinitzer, Frankfurt am Main (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 15/536,593

(22) PCT Filed: Dec. 17, 2015

(86) PCT No.: PCT/EP2015/080279
§ 371 (c)(1),
(2) Date: Jun. 15, 2017

(87) PCT Pub. No.: WO2016/097178
PCT Pub. Date: Jun. 23, 2016

(65) Prior Publication Data
US 2018/0192644 A1    Jul. 12, 2018

(30) Foreign Application Priority Data
Dec. 19, 2014 (DE) ......... 10 2014 019 239

(51) Int. Cl.
| | | |
|---|---|---|
| A01N 25/30 | (2006.01) | |
| C11D 1/29 | (2006.01) | |
| C11D 3/04 | (2006.01) | |
| A01N 25/24 | (2006.01) | |
| C11D 1/12 | (2006.01) | |

(52) U.S. Cl.
CPC ............ *A01N 25/30* (2013.01); *A01N 25/24* (2013.01); *C11D 1/12* (2013.01); *C11D 1/29* (2013.01); *C11D 3/046* (2013.01)

(58) Field of Classification Search
CPC .......... A01N 25/30; A01N 25/24; C11D 1/12; C11D 1/29; C11D 3/046
See application file for complete search history.

(56) References Cited

U.S. PATENT DOCUMENTS

| | | | |
|---|---|---|---|
| 6,054,055 A | 4/2000 | Burlew | |
| 7,371,715 B2 | 5/2008 | Yui | |
| 8,110,529 B2* | 2/2012 | Frisch | A01N 25/04 504/118 |
| 2005/0266995 A1 | 12/2005 | Frisch | |
| 2005/0266998 A1* | 12/2005 | Frisch | A01N 25/30 504/364 |
| 2008/0045415 A1* | 2/2008 | Baur | A01N 57/20 504/127 |

FOREIGN PATENT DOCUMENTS

| | | |
|---|---|---|
| CN | 1536061 | 10/2004 |
| CN | 1960629 | 5/2007 |
| CN | 101472473 | 7/2009 |
| DE | 19735763 | 2/1999 |
| EP | 0539588 | 5/1993 |
| EP | 1869978 | 12/2007 |
| GB | 2006255 | 5/1979 |
| JP | 2002201493 | 7/2002 |
| JP | 2008110953 | 5/2008 |
| WO | 9616540 | 6/1996 |
| WO | 9846203 | 10/1998 |
| WO | 2002096882 | 12/2002 |
| WO | 2003106457 | 12/2003 |
| WO | 2004099160 | 11/2004 |
| WO | 2005035486 | 4/2005 |
| WO | 2005077934 | 8/2005 |
| WO | 2006056433 | 6/2006 |
| WO | 2006089633 | 8/2006 |
| WO | 2006100288 | 9/2006 |
| WO | 2007040280 | 4/2007 |
| WO | 2007057407 | 5/2007 |
| WO | 2007075459 | 7/2007 |
| WO | 2007101369 | 9/2007 |
| WO | 2007115643 | 10/2007 |
| WO | 2007115644 | 10/2007 |
| WO | 2007149134 | 12/2007 |
| WO | 2005085216 | 1/2008 |
| WO | 2008009360 | 1/2008 |
| WO | 2008066153 | 6/2008 |

(Continued)

OTHER PUBLICATIONS

D.A. Williams et al., "2. Drug Design and Relationship of Functional Groups to Pharmacologic Activity," Foye's Principles of Medicinal Chemistry, 5th Edition, Copyright 2002, p. 37-67.*
Abstract of Fine Petrochemical Industry, Chen Yi, vol. 13, No. 9, Sep. 30, 1999, "Surfactants and detergents", TQ649.6, JSH9909234, p. 12.
Abstract of Fine Petrochemical Industry, Chen Yi, vol. 13, No. 5, May 31, 1999, "Application of surfactants", TQ423.9, JSH9905430, p. 25.
PocketDyne BP2100 Bubble Pressure Tensiometer, Technical Information Guide, 2007, 2 pages.
International Search Report for PCT/EP2015/080279, dated Mar. 1, 2016, 2 pages.

(Continued)

*Primary Examiner* — Monica A Shin
(74) *Attorney, Agent, or Firm* — Tod A. Waldrop

(57) ABSTRACT

The invention relates to adjuvant compositions which contain a) one or more polyalkylene glycol sulfate salts or polyalkylene glycol sulfonate salts, b) water, and c) one or more electrolytes dissociated into ions. Said adjuvant compositions can be preferably used combined with pharmaceutical active ingredients, agrochemical active ingredients, biocides or repellents which have a high electrolyte content.

18 Claims, No Drawings

(56) References Cited

FOREIGN PATENT DOCUMENTS

| WO | 2008067911 | 6/2008 |
| WO | 2008104503 | 9/2008 |
| WO | 2009029561 | 3/2009 |
| WO | 2009049851 | 4/2009 |
| WO | 2010006713 | 1/2010 |
| WO | 2010069502 | 6/2010 |
| WO | 2010074747 | 7/2010 |
| WO | 2010074751 | 7/2010 |

OTHER PUBLICATIONS

International Preliminary Report on Patentability for PCT/EP2015/080279, dated Jun. 29, 2017, 8 pages.

* cited by examiner

AQUEOUS ELECTROLYTE-CONTAINING ADJUVANT COMPOSITIONS, ACTIVE INGREDIENT-CONTAINING COMPOSITIONS AND THE USE THEREOF

The invention relates to aqueous adjuvant compositions comprising selected surfactants and to the use thereof for formulation of active ingredient compositions, and especially to aqueous pesticide compositions comprising the adjuvant compositions.

Pesticides (particularly herbicides, fungicides and insecticides) are chemical substances, prepared synthetically or of natural origin, which penetrate into plant cells or tissue or into parasitic organisms in or on the plant and damage and/or destroy them. The majority of pesticides are herbicides. Pesticides are typically used in the form of liquid or solid concentrated preparations (formulations) in agriculture. These are easier for the user to handle or ensure higher efficacy of the active ingredient. The formulations are typically diluted with water prior to use and then deployed by spray application.

Water-soluble concentrates (soluble liquids, abbreviated to SL) are an important form of pesticide preparations. They play a major role particularly in the case of herbicides, pesticides often being used in the form of water-soluble salts which are converted to their alkali metal or ammonium salts by neutralization of the acid form of the herbicides with suitable bases. Under some circumstances, a second water-insoluble active ingredient is present in the pesticide preparation. In that case, the preparation is a suspension concentrate (SC), even when an active ingredient is dissolved in the aqueous phase.

A particularly important role is played by the water-soluble salts of herbicides, for example of glyphosate or glufosinate or of the auxin herbicides such as 2,4-D or dicamba. They are preferably used as the alkali metal salt or in the form of various ammonium salts or as a mixture of these salts, usually as aqueous formulations.

A general problem affecting the application of pesticides, but also of other active ingredients, is that only a fraction of the active ingredient develops the desired activity. The greater portion is often lost unutilized, in that the active ingredient does not reach the leaves or roots of the plant on deployment, for example, of a spray liquor, but seeps away unutilized in the soil, is washed away by rain or is simply not properly absorbed by the plant. Corresponding problems can also arise in applications of active ingredient compositions in humans or animals.

This ecological and economic drawback can be reduced by addition of auxiliaries, referred to in the art as "adjuvant(s)", to active ingredient formulations. These auxiliaries are able, for example, to reduce spray drift, improve the wetting of the organism to be treated, for example the plant, or ensure that the active ingredient sticks on the surface for longer or is better absorbed. Especially in the case of water-soluble pesticides, such as glyphosate, the type and amount of the adjuvants used have a crucial influence on the efficacy of the formulation.

By far the most commonly used adjuvants in aqueous herbicide formulations are fatty amine ethoxylates, mainly tallowamine ethoxylates. However, these products are a cause for concern because of their toxic and ecotoxicological properties, such as severe eye irritation or toxicity toward aquatic organisms, and are increasingly being replaced by adjuvants having a better toxicological and ecotoxicological profile.

Adjuvants which are used in aqueous active ingredient formulations are typically in liquid form, i.e. in the form of water-miscible solutions, in order to simplify the production of the active ingredient formulation. The adjuvant solutions may comprise water and/or water-miscible solvents which, together with the active ingredient, give rise to a homogeneous and storage-stable aqueous formulation. If possible, water is used as solvent, since it is preferable both for reasons of cost and from an environmental standpoint. If necessary, cosolvents capable of improving the solubility or stability are added.

The demands on adjuvants in aqueous active ingredient compositions have grown steadily over the years. As well as high biological efficacy and safety, both from the user's point of view and from an environmental standpoint, more advantageous performance properties are increasingly being demanded. The adjuvants are to enable maximum loading of the formulation with the active ingredient and have maximum compatibility with various active ingredients. The formulations have to be storage-stable and have minimum viscosity, in order to assure easier handling, and facilitate the maximum emptying of the container. Moreover, good miscibility and rapid dissolution capacity, also and particularly in cold water, in the mixing of the spray liquor is required.

The problem addressed was thus that of providing further aqueous adjuvant compositions that are highly effective, feature a very advantageous toxicological and ecological profile and have advantageous properties from a performance point of view. Further desirable properties of an adjuvant are high salt tolerance, i.e. the ability to absorb high concentrations of dissolved salts, and low dynamic surface tension, which brings about good wetting of organisms to be treated and permits the solubilization of active ingredients, especially of electrolyte active ingredients, so as to result in excellent compatibility with the organism treated, for example a plant.

For production of aqueous active ingredient compositions, a wide variety of different surfactants and surfactant combinations have already been used. As well as anionic surfactants, nonionic surfactants or combinations of anionic and nonionic surfactants are frequently also used.

A known group of surfactants is that of sulfated polyalkylene glycol ethers. Polyalkylene glycol ether sulfate salts of this kind have been proposed to date as emulsifiers for emulsion polymerization (cf., for example, safety data sheet according to Directive (EU) No. 453/2010 relating to EMULSOGEN® PF 20 S). These surfactants have not been used to date in active ingredient formulations.

It has now been found that, surprisingly, polyalkylene glycol ether sulfate salts can be used advantageously in aqueous systems which can have a high content of dissociated salts (electrolytes) and which permit the formulation of compositions with low dynamic surface tension. This is of great significance for the formulation of water-soluble active ingredients, especially of the most important herbicides, such as glyphosate.

The present invention relates to a preferably monophasic adjuvant composition comprising
a) one or more polyalkylene glycol ether sulfate salts or polyalkylene glycol ether sulfonate salts,
b) water, and
c) one or more electrolytes dissociated into ions.

Active ingredients in the context of the present description refer to substances which have a specific effect and cause a specific reaction in an organism.

Active ingredients in the context of the present description refer especially to active pharmaceutical ingredients, i.e. pharmaceutically active constituents of medicaments for humans and/or animals; active cosmetic ingredients, i.e. active constituents of cosmetics; active agrochemical ingredients, i.e. active constituents of crop protection compositions; biocides, i.e. active constituents of pesticides; repellents, i.e. active constituents of compositions for defence of plants or animals; and active cleaning composition ingredients, i.e. cleaning-active constituents of cleaning compositions, for example enzymes.

Electrolytes in the context of the present description refer to chemical compounds that are in dissociated form as ions in aqueous solution. In general, these are thus salts that dissociate into ions on dissolution in water. The electrolytes also include water-soluble active ingredients or water-soluble constituents of washing and cleaning compositions. These preferably comprise one or more groups, such as carboxylic acid, sulfonic acid, phosphoric acid, phosphonic acid or ammonium radicals. These radicals have counterions which dissociate on dissolution of the compound in water.

Component a) of the composition of the invention is a sulfated polyalkylene glycol. Surfactants of this type may contain one or more sulfate groups and/or sulfonate groups per molecule. These surfactants preferably contain one or more sulfate groups.

Particularly preferred surfactants of this type have the following structure:

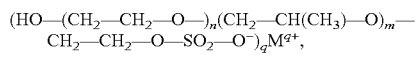

in which
n and m are independently integers from 2 to 40,
q is 1 or 2, and
M is a mono- or divalent cation.

Typically, the surfactants of component a) contain repeat structural units having two to four carbon atoms, i.e. units derived from ethylene oxide, from propylene oxide and/or from butylene oxide. Preferably, surfactants of component a) contain ethylene oxide units and/or propylene oxide units. These may be present in the molecule in random distribution, or in the form of blocks. The surfactants of component a) preferably contain an average of one sulfate group per molecule. The surfactants of component a) generally occur as a mixture of oligomers or of polymers having a different degree of polymerization or different molecular weight. Typical degrees of polymerization are in the range from 5 to 80, preferably from 5 to 60 and more preferably from 10 to 40 repeat units per molecule.

Preference is given to adjuvant compositions wherein component a) comprises ethylene oxide units, propylene oxide units and/or butylene oxide units, especially ethylene oxide units and propylene oxide units.

Particular preference is given to adjuvant compositions wherein component a) contains blocks of ethylene oxide units and of propylene oxide units.

The counterions of the sulfate group(s) or the sulfonate group(s) of component a) may be as desired. The counterions are typically mono- to trivalent cations, especially mono- to divalent cations.

Preference is given to adjuvant compositions wherein the polyalkylene glycol ether sulfate salt of component a) is an alkali metal salt, alkaline earth metal salt, sulfonium salt and/or ammonium salt, especially an ammonium salt, a sulfonium salt, a sodium salt or a potassium salt.

Of the ammonium salts, preference is given especially to those which derive from an alkylamine, dialkylamine or trialkylamine, for example from isopropylamine (IPA or MIPA), from diglycolamine (DGA), from dimethylamine (DMA) or from N,N-bis(3-aminopropyl)methylamine (BAPMA) or from ammonia. The alkyl radicals of these alkylamines may be branched or linear and saturated or unsaturated.

Of the sulfonium salts, preference is given especially to trimethylsulfonium salts.

The amount of component a) in the adjuvant compositions of the invention may vary within wide ranges. Preferably, the proportion of the one or more polyalkylene glycol ether sulfate salts or sulfonate salts a) in the adjuvant compositions of the invention is 2% to 90% by weight, preferably 5% to 60% by weight and more preferably 5% to 15% by weight, based on the total weight of the composition. The proportion of the polyalkylene glycol ether sulfate or sulfonate salt a) can still be lowered by dilution with water.

As component b), the adjuvant compositions of the invention comprise water. Useful water includes, for example, demineralized water, groundwater, seawater or tap water; preferably, the water has a hardness below 15° dH (German hardness).

The amount of component b) in the adjuvant compositions of the invention may likewise vary within wide ranges. Preferably, the proportion of the water b) in the adjuvant compositions of the invention is 10% to 98% by weight, preferably 20% to 70% by weight and more preferably 30% to 50% by weight, based on the total weight of the composition. This proportion of water can still be increased by dilution.

The amount of component c) too in the adjuvant compositions of the invention may vary within wide ranges. Preferably, the proportion of the one or more electrolytes c) in the adjuvant compositions of the invention is 1% to 95% by weight, preferably 10% to 95% by weight and more preferably 20% to 90% by weight, based on the total weight of the composition. The proportion of the electrolyte c) can still be lowered by dilution with water.

The electrolyte c) quite generally comprises water-soluble salts. The metal salts may, for example, be those having mono- to trivalent cations and any mono- to trivalent anions. Preferably, the electrolyte c) is selected from the group of the alkali metal salts, the alkaline earth metal salts and/or the ammonium salts of inorganic and/or organic anions, especially of ammonium salts derived from an alkylamine, dialkylamine or trialkylamine derive, for example from isopropylamine (IPA or MIPA), from diglycolamine (DGA), from dimethylamine (DMA) or from N,N-bis(3-aminopropyl)methylamine (BAPMA) or from ammonia.

Most preferably, the electrolyte c) is a water-soluble active ingredient.

The term "water-soluble" or "water solubility" in the context of this description is understood to mean that the chemical compound in question dissolves to an extent of at least 1 g/L in water at 25° C.

Correspondingly, the term "water-insoluble" or "water insolubility" in the context of this description is understood to mean that the chemical compound in question dissolves to an extent of less than 1 g/L in water at 25° C.

The invention further provides a composition comprising the above-described components a), b) and c), and additionally at least one water-insoluble active ingredient d).

The water-insoluble active ingredient d) used in accordance with the invention may in principle be a substance which has a specific effect and causes a specific reaction in an organism, or which is a cleaning-active component of a washing and cleaning composition.

Preferably, the water-soluble active ingredient c) and/or the water-insoluble active ingredient d) is a compound which is selected from the group consisting of medicaments, active agrochemical ingredients, biocides and repellents, particularly from pesticides and especially from herbicides, fungicides and insecticides, active cosmetic ingredients or constituents of washing and cleaning compositions.

Particularly preferred compositions of the invention comprise, as well as the above-described components a) to c) and optionally d), at least one of the additional components e) to h)

e) one or more alkylglucamides of the formula (I)

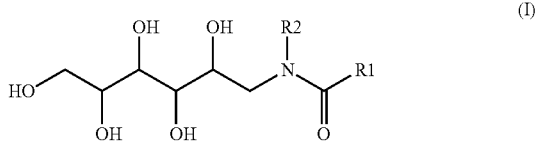

in which
R1 is a linear or branched alkyl group having 5 to 12 carbon atoms, preferably having 7 to 9 carbon atoms,
R2 is an alkyl group having 1 to 3 carbon atoms, preferably methyl,
f) propylene glycol, dipropylene glycol, mixtures of propylene glycol and dipropylene glycol, each optionally in a mixture with polypropylene glycol and/or polyethylene glycol, each having up to ten repeat units,
g) one or more cosolvents, and/or
h) one or more auxiliaries.

Very particular preference is given to adjuvant compositions comprising
a) 20% to 40% by weight of a polyalkylene glycol ether sulfate salt, especially of Emulsogen PF20 S,
b) water,
c) 10% to 20% by weight of ammonium sulfate, and
e) 40% to 60% by weight of an alkylglucamide of the formula (I) in which R1 is a linear or branched alkyl group having 7 to 9 carbon atoms, and R2 is methyl, and
in which the percentages are based on the total amount of components a), b), c) and e).

The adjuvant composition of the invention especially increases the efficacy of electrolyte active ingredients, i.e. of active ingredients in the form of water-soluble salts.

In a preferred embodiment, the adjuvant composition, aside from water and optionally propylene glycol, does not comprise any further solvents.

In a further preferred embodiment, the adjuvant composition consists of the above-described components a) to d).

As component e), the composition of the invention may comprise one or more alkylglucamides of the formula (I).

In the one or more alkylglucamide(s) of the formula (I), the R1 radical is preferably a linear or branched alkyl group having 7 to 9 carbon atoms. The R2 radical is preferably a methyl group.

More preferably, the compositions of the invention comprise, as component e), a mixture of octyl-N-methylglucamide ($R^1=C_7$-alkyl, $R^2$=methyl) and decyl-N-methylglucamide ($R^1=C_9$-alkyl, $R^2$=methyl). This product is obtainable under the Synergen® GA name from Clariant. The proportion of octyl-N-methylglucamide in this mixture is 10% to 90% by weight, preferably 20% to 80% by weight and more preferably 30% to 70% by weight, based on the total amount of the alkylglucamides present in this mixture. The proportion of decyl-N-methylglucamide in this mixture is 10% to 90% by weight, preferably 20% to 80% by weight and more preferably 30% to 70% by weight, based on the total amount of the alkylglucamides present in this mixture. Preference is also given to nonyl-N-methylglucamide ($R^1=C_8$-alkyl, $R^2$=methyl, based on pelargonic acid).

The pentahydroxyhexyl radical in the alkylglucamides of the formula (I) has various chiral centers, such that several stereoisomers can exist in each case. Typically, the alkylglucamides of the formula (I) are prepared from naturally occurring sugars, such as D-glucose, but the use of other natural or synthetic hexoses or other $C_6$ units is also possible in principle, such that different stereoisomers of the formula (I) can result.

The preparation of the alkylglucamides of the formula (I) has been sufficiently well-described before and is known to the person skilled in the art. It is effected, for example, by condensation of carboxylic esters with a secondary N-alkylglucamine, which can in turn be prepared by reductive amination from a sugar such as D-glucose.

Preferably, the compositions of the invention contain 1% to 90% by weight, more preferably 2% to 30% by weight and especially preferably 2% to 15% by weight of the one or more alkylglucamides of component e).

With the above-described alkylglucamides of the formula (I), it is possible to produce compositions of the invention comprising active ingredient d), especially aqueous herbicide formulations, having excellent performance properties.

The alkylglucamides of the formula (I) are preferably based on renewable raw materials and feature an advantageous toxicological and ecological profile. They have a high solubility in water.

The use of sugar-based surfactants such as alkyl-N-methylglucosamides, for example in cleaning compositions and cosmetic products, is described in the literature (F. W. Lichtenthaler, "Carbohydrates as Organic Raw Materials" in Ullmann's Encyclopedia of Industrial Chemistry, Wiley-VCH Verlag, 2010).

WO 96/16540 describes pesticide compositions which long-chain alkylamides which bear a polyhydroxycarbonyl substituent having at least three hydroxyl groups on the amide nitrogen. The examples describe emulsion concentrates, water-dispersible powders and granules of dodecyl-N-methylglucamide, dodecyltetradecyl-N-methylglucamide and cetylstearyl-N-methylglucamide.

As component f), the compositions of the invention may comprise propylene glycol or dipropylene glycol, and combinations of the two with one another or with polypropylene glycol or polyethylene glycol having up to 10 repeat units. Preference is given to propylene glycol.

The content of component f) is preferably 1% to 30% by weight, more preferably 2% to 10% by weight and especially preferably 2% to 5% by weight.

In one embodiment, the adjuvant compositions may comprise, in addition to components a) to d), in addition to component b), a further cosolvent g).

The cosolvent g) optionally present may either be present as a secondary component from the preparation process for the alkylglucamide or have been added subsequently to the adjuvant composition. The cosolvent may be a single solvent or a mixture of two or more solvents. Suitable solvents for this purpose are all polar solvents that are compatible with the aqueous pesticide composition and form a homogeneous phase. Suitable cosolvents are, for example, monohydric alcohols such as methanol, ethanol, propanols, butanols, benzyl alcohol or further polyhydric alcohols such as ethylene glycol, diethylene glycol or glycerol, or polyglycols such as polyethylene glycols, polypropylene glycols or mixed polyalkylene glycols (PAGs). Further suitable solvents are ethers, for example propylene glycol mono- or dimethyl ether, dipropylene glycol mono- or dimethyl ether, amides, for example N-methyl- or N-ethylpyrrolidone, N,N-dimethyllactamide, -caprylamide or -decanamide.

The proportion of the cosolvent in the composition, if present, is typically 10 to 250 g/L, preferably 20 to 200 g/L and more preferably 30 to 150 g/L.

In a preferred embodiment, the adjuvant of the invention does not contain any further cosolvent g).

In a further embodiment, the compositions of the invention may comprise, as well as components a) to c) and optionally d) to g), one or more further auxiliaries h), which may, for example, be preservatives, surfactants, defoamers, functional polymers or additional adjuvants. Examples of such auxiliaries can be found further down.

The adjuvant compositions are preferably suitable as adjuvants in aqueous pesticide compositions for improving the biological activity of, for example, herbicides, insecticides, fungicides, acaricides, bactericides, molluscicides, nematicides and rodenticides.

Preferred pesticides include fungicides, bactericides, insecticides, acaricides, nematicides, herbicides, plant growth regulators, plant nutrients and repellents.

Particularly preferred compositions of the invention comprise, as well as the above-described components a) and b), as component c), one or more water-soluble pesticides and optionally one or more water-insoluble pesticides d).

The compositions of the invention are especially suitable for combinations with one or more of the following water-soluble active ingredients (component c)): acifluorfen, aminopyralid, amitrole, asulam, benazolin, bentazon, bialaphos, bispyribac, bromacil, bromoxynil, bicyclopyron, chloramben, clopyralid, 2,4-D, 2,4-DB, dicamba, dichlorprop, difenzoquat, diquat, endothal, fenoxaprop, flamprop, florasulam, flumiclorac, fluoroglycofen, fluroxypyr, fomesafen, fosamine, glufosinate, glyphosate, imazameth, imazamethabenz, imazamox, imazapic, imazapyr, imazaquin, imazethapyr, MCPA, MCPB, mecoprop, mesotrione, nicosulfuron, octanoic acid, pelargonic acid, picloram, quizalofop, 2,3,6-TBA, sulcotrione, tembotrione and triclopyr are preferred.

Further preferred compositions of the invention comprise one or more water-soluble pesticides as component c) which are selected from water-soluble salts of 2,4-D, bentazon, dicamba, fomesafen, glyphosate, glufosinate, MCPA, mesotrione, paraquat and sulcotrione, more preferably from the water-soluble salts of glyphosate and dicamba.

Water-soluble salts of pesticides of component c), especially of glyphosate and dicamba, are preferably used in the form of alkali metal, alkaline earth metal, sulfonium and/or ammonium salts, especially of ammonium salts, sulfonium salts, sodium salts or potassium salts.

Of the ammonium salts of these water-soluble pesticides of component c), especially of glyphosate and dicamba, preference is given especially to isopropylammonium, dimethylammonium or ammonium salts.

Of the sulfonium salts of these water-soluble pesticides of component c), especially of glyphosate and dicamba, preference is given especially to trimethylsulfonium salts.

Of the alkali metal salts of these water-soluble pesticides of component c), especially of glyphosate and dicamba, preference is given especially to sodium or potassium salts.

The compositions of the invention may additionally, in the formulation or else the spray liquor, comprise further pesticides which may be present in dissolved or else dispersed form.

There follow further examples of pesticides which may be present in dissolved form as component c) or in undissolved form as component d) or which may constitute combination partners for these pesticides.

Examples of herbicides include:

Active ingredients based on inhibition of, for example, acetolactate synthase, acetyl-CoA carboxylase, cellulose synthase, enolpyruvylshikimate-3-phosphate synthase, glutamine synthetase, p-hydroxyphenylpyruvate dioxygenase, phytoendesaturase, photosystem I, photosystem II, protoporphyrinogen oxidase, can be used, as described, for example, in Weed Research 26 (1986) 441-445 or "The Pesticide Manual", 16th edition, The British Crop Protection Council and the Royal Soc. of Chemistry, 2012 and literature cited therein. Examples of known herbicides or plant growth regulators which can be combined with the inventive compounds include the active ingredients which follow (the compounds are designated by the "common name" according to the International Organization for Standardization (ISO) or by the chemical name or by the code number) and always encompass all use forms, such as acids, salts, esters and isomers, such as stereoisomers and optical isomers. One administration form or else, in some cases, more than one administration form is mentioned by way of example: acetochlor, acibenzolar, acibenzolar-S-methyl, acifluorfen, acifluorfen-sodium, aclonifen, alachlor, allidochlor, alloxydim, alloxydim-sodium, ametryne, amicarbazone, amidochlor, amidosulfuron, aminocyclopyrachlor, aminocyclopyrachlor-potassium, aminocyclopyrachlor-methyl, aminopyralid, amitrole, ammonium sulfamate, ancymidol, anilofos, asulam, atrazine, aviglycine, azafenidin, azimsulfuron, aziprotryne, beflubutamid, benazolin, benazolin-ethyl, bencarbazone, benfluralin, benfuresate, bensulide, bensulfuron, bensulfuron-methyl, bentazone, benzfendizone, benzobicyclon, benzofenap, benzofluor, benzoylprop, benzyladenine, bicyclopyrone, bifenox, bilanafos, bilanafos-sodium, bispyribac, bispyribac-sodium, bromacil, bromobutide, bromofenoxim, bromoxynil, bromuron, buminafos, busoxinone, butachlor, butafenacil, butamifos, butenachlor, butralin, butroxydim, butylate, cafenstrole, carbaryl, carbetamide, carfentrazone, carfentrazone-ethyl, carvone, chlorocholine chloride, chlomethoxyfen, chloramben, chlorazifop, chlorazifop-butyl, chlorbromuron, chlorbufam, chlorfenac, chlorfenac-sodium, chlorfenprop, chlorflurenol, chlorflurenol-methyl, chloridazon, chlorimuron, chlorimuron-ethyl, chlormequat-chloride, chlornitrofen, 4-chlorophenoxyacetic acid, chlorophthalim, chlorpropham, chlorthal-dimethyl, chlortoluron, chlorsulfuron, cinidon, cinidon-ethyl, cinmethylin, cinosulfuron, clethodim, clodinafop, clodinafop-propargyl, clofencet, clomazone, clomeprop, cloprop, clopyralid, cloransulam, cloransulam-methyl, cloxyfonac, cumyluron, cyanamide, cyanazine, cyclanilide, cycloate, cyclosulfamuron, cycloxydim, cycluron, cyhalofop, cyhalofop-butyl, cyperquat, cyprazine, cyprazole, cytokinine, 2,4-D, 2,4-DB, daimuron/dymron, dalapon, daminozide, dazomet, n-decanol, desmedipham, desmetryn, detosyl-pyrazolate (DTP), diallate, diaminozide, dicamba, dichlobenil, dichlorprop, dichlorprop-P, diclofop, diclofop-methyl, diclofop-P-methyl, diclosulam, diethatyl, diethatyl-ethyl, difenoxuron, difenzoquat, diflufenican, diflufenzopyr, diflufenzopyr-sodium, dikegulac-sodium, dimefuron, dimepiperate, dimethachlor, dimethametryn, dimethenamid, dimethenamid-P, dimethipin, dimetrasulfuron, dinitramine, dinoseb, dinoterb, diphenamid, diisopropylnaphthalene, dipropetryn, diquat, diquat-dibromide, dithiopyr, diuron, DNOC, eglinazine-ethyl, endothal, EPTC, esprocarb, ethalfluralin, ethametsulfuron, ethametsulfuron-methyl, ethyl naphthylacetate, ethephon, ethidimuron, ethiozin, ethofumesate, ethoxyfen, ethoxyfen-ethyl, ethoxysulfuron, etobenzanid, F-5331, i.e. N-[2-chloro-4-fluoro-5-[4-(3-fluoropropyl)-4,5-dihydro-5-oxo-1H-tetrazol-1-yl]phenyl]ethanesulfonamide, F-7967, i.e. 3-[7-chloro-5-fluoro-2-(trifluoromethyl)-1H-benzimidazol-4-yl]-1-methyl-6-(trifluoromethyl)pyrimidine-2,4(1H,3H)-dione, fenoprop, fenoxaprop, fenoxaprop-P, fenoxaprop-ethyl, fenoxaprop-P-ethyl, fenoxasulfone, fentrazamide, fenuron, flamprop, flamprop-M-isopropyl, flamprop-M-methyl, flazasulfuron, florasulam, fluazifop, fluazifop-P, fluazifop-butyl, fluazifop-P-butyl, fluazolate, flucarbazone, flucarbazone-sodium, flucetosulfuron, fluchloralin, flufenacet (thiafluamide), flufenpyr, flufenpyr-ethyl, flumetralin, flumetsulam, flumiclorac, flumiclorac-pentyl, flumioxazin, flumipropyn, fluometuron, fluorodifen, fluoroglycofen, fluoroglycofen-ethyl, flupoxam, flupropacil, flupropanate, flupyrsulfuron, flupyrsulfuron-methyl-sodium, flurenol, flurenol-butyl, fluridone, flurochloridone, fluroxypyr, fluroxypyr-meptyl, flurprimidol, flurtamone, fluthiacet, fluthiacet-methyl, fluthiamide, fomesafen, foramsulfuron, forchlorfenuron, fosamine, furyloxyfen, gibberellic acid, glufosinate, glufosinate-ammonium, glufosinate-P, glufosinate-P-ammonium, glufosinate-P-sodium, glyphosate, glyphosate-isopropylammonium, H-9201, i.e. O-(2,4-dimethyl-6-nitrophenyl) O-ethyl isopropylphosphoramidothioate, halosafen, halosulfuron, halosulfuron-methyl, haloxyfop, haloxyfop-P, haloxyfop-ethoxyethyl, haloxyfop-P-ethoxyethyl, haloxyfop-methyl, haloxyfop-P-methyl, hexazinone, HW-02, i.e. 1-(dimethoxyphosphoryl)ethyl (2,4-dichlorophenoxy)acetate, imazamethabenz, imazamethabenz-methyl, imazamox, imazamox-ammonium, imazapic, imazapyr, imazapyr-isopropylammonium, imazaquin, imazaquin-ammonium, imazethapyr, imazethapyr-ammonium, imazosulfuron, inabenfide, indanofan, indaziflam, indoleacetic acid (IAA), 4-indol-3-ylbutyric acid (IBA), iodosulfuron, iodosulfuron-methyl-sodium, iofensulfuron, iofensulfuron-sodium, ioxynil, ipfencarbazone, isocarbamid, isopropalin, isoproturon, isouron, isoxaben, isoxachlortole, isoxaflutole, isoxapyrifop, KUH-043, i.e. 3-({[5-(difluoromethyl)-1-methyl-3-(trifluoromethyl)-1H-pyrazol-4-yl]methyl}sulfonyl)-5,5-dimethyl-4,5-dihydro-1,2-oxazole, karbutilate, ketospiradox, lactofen, lenacil, linuron, maleic hydrazide, MCPA, MCPB, MCPB-methyl, -ethyl and -sodium, mecoprop, mecoprop-sodium, mecoprop-butotyl, mecoprop-P-butotyl, mecoprop-P-dimethylammonium, mecoprop-P-2-ethylhexyl, mecoprop-P-potassium, mefenacet, mefluidide, mepiquat-chloride, mesosulfuron, mesosulfuron-methyl, mesotrione, methabenzthiazuron, metam, metamifop, metamitron, metazachlor, metazasulfuron, methazole, methiopyrsulfuron, methiozolin, methoxyphenone, methyldymron, 1-methylcyclopropene, methyl isothiocyanate, metobenzuron, metobromuron, metolachlor, S-metolachlor, metosulam, metoxuron, metribuzin, metsulfuron, metsulfuron-methyl, molinate, monalide, monocarbamide, monocarbamide dihydrogensulfate, monolinuron, monosulfuron, monosulfuron ester, monuron, MT-128, i.e. 6-chloro-N-[(2E)-3-chloroprop-2-en-1-yl]-5-methyl-N-phenylpyridazin-3-amine, MT-5950, i.e. N-[3-chloro-4-(1-methylethyl)phenyl]-2-methylpentanamide, NGGC-011, 1-naphthylacetic acid (NAA), naphthylacetamide (NAAm), 2-naphthoxyacetic acid, naproanilide, napropamide, naptalam, NC-310, i.e. 4-(2,4-dichlorobenzoyl)-1-methyl-5-benzyloxypyrazole, neburon, nicosulfuron, nipyraclofen, nitralin, nitrofen, nitroguaiacolate, nitrophenolate-sodium (isomer mixture), nitrofluorfen, nonanoic acid, norflurazon, orbencarb, orthosulfamuron, oryzalin, oxadiargyl, oxadiazon, oxasulfuron, oxaziclomefone, oxyfluorfen, paclobutrazole, paraquat, paraquat dichloride, pelargonic acid (nonanoic acid), pendimethalin, pendralin, penoxsulam, pentanochlor, pentoxazone, perfluidone, pethoxamid, phenisopham, phenmedipham, phenmedipham-ethyl, picloram, picolinafen, pinoxaden, piperophos, pirifenop, pirifenop-butyl, pretilachlor, primisulfuron, primisulfuron-methyl, probenazole, profluazole, procyazine, prodiamine, prifluraline, profoxydim, prohexadione, prohexadione-calcium, prohydrojasmone, prometon, prometryn, propachlor, propanil, propaquizafop, propazine, propham, propisochlor, propoxycarbazone, propoxycarbazone-sodium, propyrisulfuron, propyzamide, prosulfalin, prosulfocarb, prosulfuron, prynachlor, pyraclonil, pyraflufen, pyraflufen-ethyl, pyrasulfotole, pyrazolynate (pyrazolate), pyrazosulfuron, pyrazosulfuron-ethyl, pyrazoxyfen, pyribambenz, pyribambenz-isopropyl, pyribambenz-propyl, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quinoclamine, quizalofop, quizalofop-ethyl, quizalofop-P, quizalofop-P-ethyl, quizalofop-P-tefuryl, rimsulfuron, saflufenacil, secbumeton, sethoxydim, siduron, simazine, simetryn, SN-106279, i.e. methyl (2R)-2-({7-[2-chloro-4-(trifluoromethyl)phenoxy]-2-naphthyl}oxy)propanoate, sulcotrione, sulfallate (CDEC), sulfentrazone, sulfometuron, sulfometuron-methyl, sulfosate (glyphosate-trimesium), sulfosulfuron, SW-065, SYN-523, SYP-249, i.e. 1-ethoxy-3-methyl-1-oxobut-3-en-2-yl 5-[2-chloro-4-(trifluoromethyl)phenoxy]-2-nitrobenzoate, SYP-300, i.e. 1-[7-fluoro-3-oxo-4-(prop-2-yn-1-yl)-3,4-dihydro-2H-1,4-benzoxazin-6-yl]-3-propyl-2-thioxoimidazolidine-4,5-dione, tebutam, tebuthiuron, tecnazene, tefuryltrione, tembotrione, tepraloxydim, terbacil, terbucarb, terbuchlor, terbumeton, terbuthylazine, terbutryne, thenylchlor, thiafluamide, thiazafluron, thiazopyr, thidiazimin, thidiazuron, thiencarbazone, thiencarbazone-methyl, thifensulfuron, thifensulfuron-methyl, thiobencarb, tiocarbazil, topramezone, tralkoxydim, triafamone, triallate, triasulfuron, triaziflam, triazofenamide, tribenuron, tribenuron-methyl, tribufos, trichloroacetic acid (TCA), triclopyr, tridiphane, trietazine, trifloxysulfuron, trifloxysulfuron-sodium, trifluralin, triflusulfuron, triflusulfuron-methyl, trimeturon, trinexapac, trinexapac-ethyl, tritosulfuron, tsitodef, uniconazole, uniconazole-P, vernolate, ZJ-0862, i.e. 3,4-dichloro-N-{2-[(4,6-dimethoxypyrimidin-2-yl)oxy]benzyl}aniline, and the following compounds:

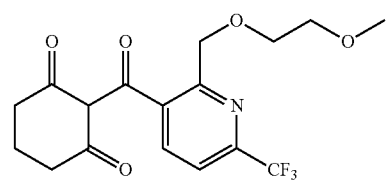

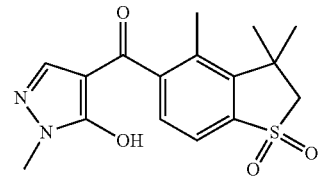

-continued

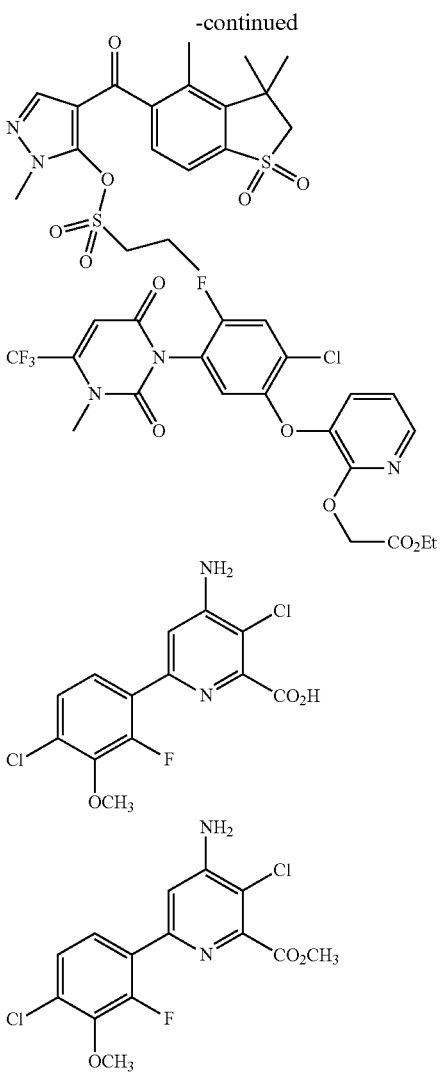

Examples of plant growth regulators further include natural plant hormones such as abscisic acid, jasmonic acid, salicylic acid and esters thereof, kinetin and brassinosteroids.

Further substances that should be mentioned are those which can act as plant growth regulators and/or plant fortifiers, in order to reduce the effect of stress factors such as heat, cold, drought, salt, oxygen deficiency or flooding on plant growth. Examples of these include glycine betaine (betaine), choline, potassium phosphate or other phosphate salts, and silicates.

Examples of plant nutrients include customary inorganic or organic fertilizers for supplying plants with macro- and/or micronutrients.

Examples of fungicides include:

(1) Ergosterol biosynthesis inhibitors, for example aldimorph, azaconazole, bitertanol, bromuconazole, cyproconazole, diclobutrazole, difenoconazole, diniconazole, diniconazole-M, dodemorph, dodemorph acetate, epoxiconazole, etaconazole, fenarimol, fenbuconazole, fenhexamid, fenpropidin, fenpropimorph, fluquinconazole, flurprimidol, flusilazole, flutriafol, furconazole, furconazole-cis, hexaconazole, imazalil, imazalil sulfate, imibenconazole, ipconazole, metconazole, myclobutanil, naftifin, nuarimol, oxpoconazole, paclobutrazole, pefurazoate, penconazole, piperalin, prochloraz, propiconazole, prothioconazole, pyributicarb, pyrifenox, quinconazole, simeconazole, spiroxamine, tebuconazole, terbinafine, tetraconazole, triadimefon, triadimenol, tridemorph, triflumizole, triforine, triticonazole, uniconazole, uniconazole-p, viniconazole, voriconazole, 1-(4-chlorophenyl)-2-(1H-1,2,4-triazol-1-yl) cycloheptanol, methyl 1-(2,2-dimethyl-2,3-dihydro-1H-inden-1-yl)-1H-imidazole-5-carboxylate, N'-{5-(difluoromethyl)-2-methyl-4-[3-(trimethylsilyl)propoxy]phenyl}-N-ethyl-N-methylimidoformamide, N-ethyl-N-methyl-N'-{2-methyl-5-(trifluoromethyl)-4-[3-(trimethylsilyl)propoxy] phenyl}imidoformamide and O-[1-(4-methoxyphenoxy)-3, 3-dimethylbutan-2-yl] 1H-imidazole-1-carbothioate.

(2) Respiration inhibitors (respiratory chain inhibitors), for example bixafen, boscalid, carboxin, diflumetorim, fenfuram, fluopyram, flutolanil, fluxapyroxad, furametpyr, furmecyclox, isopyrazam mixture of the syn-epimeric racemate 1RS,4SR,9RS and of the anti-epimeric racemate 1RS,4SR,9SR, isopyrazam (anti-epimeric racemate), isopyrazam (anti-epimeric enantiomer 1R,4S,9S), isopyrazam (anti-epimeric enantiomer 1S,4R,9R), isopyrazam (syn-epimeric racemate 1RS,4SR,9RS), isopyrazam (syn-epimeric enantiomer 1R,4S,9R), isopyrazam (syn-epimeric enantiomer 1S,4R,9S), mepronil, oxycarboxin, penflufen, penthiopyrad, sedaxane, thifluzamid, 1-methyl-N-[2-(1,1,2,2-tetrafluoroethoxy)phenyl]-3-(trifluoromethyl)-1H-pyrazole-4-carboxamide, 3-(difluoromethyl)-1-methyl-N-[2-(1,1,2,2-tetrafluoroethoxy)phenyl]-1H-pyrazole-4-carboxamide, 3-(difluoromethyl)-N-[4-fluoro-2-(1,1,2,3,3,3-hexafluoropropoxy)phenyl]-1-methyl-1H-pyrazole-4-carboxamide, N-[1-(2,4-dichlorophenyl)-1-methoxypropan-2-yl]-3-(difluoromethyl)-1-methyl-1H-pyrazole-4-carboxamide, 5,8-difluoro-N-[2-(2-fluoro-4-{[4-(trifluoromethyl)pyridin-2-yl] oxy}phenyl)ethyl]quinazolin-4-amine, N-[9-(dichloromethylene)-1,2,3,4-tetrahydro-1,4-methanonaphthalen-5-yl]-3-(difluoromethyl)-1-methyl-1H-pyrazole-4-carboxamide, N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide and N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide.

(3) Respiration inhibitors (respiratory chain inhibitors) acting on complex III of the respiratory chain, for example ametoctradin, amisulbrom, azoxystrobin, cyazofamid, coumethoxystrobin, coumoxystrobin, dimoxystrobin, enestroburin, famoxadone, fenamidone, fenoxystrobin, fluoxastrobin, kresoxim-methyl, metominostrobin, orysastrobin, picoxystrobin, pyraclostrobin, pyrametostrobin, pyraoxystrobin, pyribencarb, triclopyricarb, trifloxystrobin, (2E)-2-(2-{[6-(3-chloro-2-methylphenoxy)-5-fluoropyrimidin-4-yl]oxy}phenyl)-2-(methoxyimino)-N-methylethanamide, (2E)-2-(methoxyimino)-N-methyl-2-(2-{[({(1E)-1-[3-(trifluoromethyl)phenyl]ethylidene}amino)oxy] methyl}phenyl)ethanamide, (2E)-2-(methoxyimino)-N-methyl-2-{2-[(E)-({1-[3-(trifluoromethyl)phenyl] ethoxy}imino)methyl]phenyl}ethanamide, (2E)-2-{2-[({[(1E)-1-(3-{[(E)-1-fluoro-2-phenylethenyl]oxy}phenyl) ethylidene]amino}oxy)methyl]phenyl}-2-(methoxyimino)-N-methylethanamide, (2E)-2-{2-[({[(2E,3E)-4-(2,6-dichlorophenyl)but-3-en-2-ylidene]amino}oxy)methyl] phenyl}-2-(methoxyimino)-N-methylethanamide, 2-chloro-N-(1,1,3-trimethyl-2,3-dihydro-1H-inden-4-yl)pyridine-3-carboxamide, 5-methoxy-2-methyl-4-(2-{[({(1E)-1-[3-(trifluoromethyl)phenyl]ethylidene}amino)oxy] methyl}phenyl)-2,4-dihydro-3H-1,2,4-triazol-3-one, methyl (2E)-2-{2-[({cyclopropyl[(4-methoxyphenyl)imino]methyl}sulfanyl)methyl]phenyl}-3-methoxyprop-2-enoate, N-(3-ethyl-3,5,5-trimethylcyclohexyl)-3-(formylamino)-2-hydroxybenzamide, 2-{2-[(2,5-dimethylphenoxy)methyl]phenyl}-2-methoxy-N-methylacetamide and (2R)-2-{2-[(2,5-dimethylphenoxy)methyl]phenyl}-2-methoxy-N-methylacetamide.

(4) Mitosis and cell division inhibitors, for example benomyl, carbendazim, chlorfenazole, diethofencarb, ethaboxam, fluopicolide, fuberidazole, pencycuron, thiabendazole, thiophanate-methyl, thiophanate, zoxamide, 5-chloro-7-(4-methylpiperidin-1-yl)-6-(2,4,6-trifluorophenyl)[1,2,4]triazolo[1,5-a]pyrimidine and 3-chloro-5-(6-chloropyridin-3-yl)-6-methyl-4-(2,4,6-trifluorophenyl)pyridazine.

(5) Compounds with multisite activity, for example Bordeaux mixture, captafol, captan, chlorothalonil, copper preparations such as copper hydroxide, copper naphthenate, copper oxide, copper oxychloride, copper sulfate, dichlofluanid, dithianon, dodine, dodine free base, ferbam, fluorofolpet, folpet, guazatine, guazatine acetate, iminoctadine, iminoctadine albesilate, iminoctadine triacetate, mancopper, mancozeb, maneb, metiram, metiram zinc, oxine-copper, propamidine, propineb, sulfur and sulfur preparations, for example calcium polysulfide, thiram, tolylfluanid, zineb and ziram.

(6) Resistance inductors, for example acibenzolar-S-methyl, isotianil, probenazole and tiadinil.

(7) Amino acid and protein biosynthesis inhibitors, for example andoprim, blasticidin-S, cyprodinil, kasugamycin, kasugamycin hydrochloride hydrate, mepanipyrim, pyrimethanil and 3-(5-fluoro-3,3,4,4-tetramethyl-3,4-dihydroisoquinolin-1-yl)quinoline.

(8) Inhibitors of ATP production, for example fentin acetate, fentin chloride, fentin hydroxide and silthiofam.

(9) Cell wall synthesis inhibitors, for example benthiavalicarb, dimethomorph, flumorph, iprovalicarb, mandipropamid, polyoxins, polyoxorim, validamycin A and valifenalate.

(10) Lipid and membrane synthesis inhibitors, for example biphenyl, chloroneb, dicloran, edifenphos, etridiazole, iodocarb, iprobenfos, isoprothiolane, propamocarb, propamocarb hydrochloride, prothiocarb, pyrazophos, quintozene, tecnazene and tolclofos-methyl.

(11) Melanin biosynthesis inhibitors, for example carpropamid, diclocymet, fenoxanil, fthalide, pyroquilon, tricyclazole and 2,2,2-trifluoroethyl {3-methyl-1-[(4-methylbenzoyl)amino]butan-2-yl}carbamate.

(12) Nucleic acid synthesis inhibitors, for example benalaxyl, benalaxyl-M (kiralaxyl), bupirimate, clozylacon, dimethirimol, ethirimol, furalaxyl, hymexazol, metalaxyl, metalaxyl-M (mefenoxam), ofurace, oxadixyl and oxolinic acid.

(13) Signal transduction inhibitors, for example chlozolinate, fenpiclonil, fludioxonil, iprodione, procymidone, quinoxyfen and vinclozolin.

(14) Decouplers, for example binapacryl, dinocap, ferimzone, fluazinam and meptyldinocap.

(15) Further compounds, for example benthiazole, bethoxazin, capsimycin, carvone, chinomethionat, pyriofenone (chlazafenone), cufraneb, cyflufenamid, cymoxanil, cyprosulfamide, dazomet, debacarb, dichlorophen, diclomezine, difenzoquat, difenzoquat methylsulfate, diphenylamine, ecomat, fenpyrazamine, flumetover, fluoromide, flusulfamide, flutianil, fosetyl-aluminum, fosetyl-calcium, fosetyl-sodium, hexachlorobenzene, irumamycin, methasulfocarb, methyl isothiocyanate, metrafenone, mildiomycin, natamycin, nickel dimethyldithiocarbamate, nitrothal-isopropyl, octhilinone, oxamocarb, oxyfenthiin, pentachlorophenol and salts thereof, phenothrin, phosphoric acid and salts thereof, propamocarb-fosetylate, propanosine-sodium, proquinazid, pyrimorph, (2E)-3-(4-tert-butylphenyl)-3-(2-chloropyridin-4-yl)-1-(morpholin-4-yl)prop-2-en-1-one, (2Z)-3-(4-tert-butylphenyl)-3-(2-chloropyridin-4-yl)-1-(morpholin-4-yl)prop-2-en-1-one, pyrrolnitrin, tebufloquin, tecloftalam, tolnifanid, triazoxide, trichlamide, zarilamide, (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl 2-methylpropanoate, 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, 1-(4-{4-[5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, 1-(4-methoxyphenoxy)-3,3-dimethylbutan-2-yl 1H-imidazole-1-carboxylate, 2,3,5,6-tetrachloro-4-(methylsulfonyl)pyridine, 2,3-dibutyl-6-chlorothieno[2,3-d]pyrimidin-4(3H)-one, 2,6-dimethyl-1H,5H-[1,4]dithiino[2,3-c:5,6-c']dipyrrole-1,3,5,7(2H,6H)-tetrone, 2-[5-methyl-3-(trifluoromethyl)-1H-pyrazol-1-yl]-1-(4-{4-[(5R)-5-phenyl-4,5-dihydro-1,2-oxazol-3-yl]-1,3-thiazol-2-yl}piperidin-1-yl)ethanone, 2-[5-methyl-3-(trifluoromethyl)-1H-pyrazol-1-yl]-1-(4-{4-[(5S)-5-phenyl-4,5-dihydro-1,2-oxazol-3-yl]-1,3-thiazol-2-yl}piperidin-1-yl)ethanone, 2-[5-methyl-3-(trifluoromethyl)-1H-pyrazol-1-yl]-1-{4-[4-(5-phenyl-4,5-dihydro-1,2-oxazol-3-yl)-1,3-thiazol-2-yl]piperidin-1-yl}ethanone, 2-butoxy-6-iodo-3-propyl-4H-chromen-4-one, 2-chloro-5-[2-chloro-1-(2,6-difluoro-4-methoxyphenyl)-4-methyl-1H-imidazol-5-yl]pyridine, 2-phenylphenol and salts thereof, 3-(4,4,5-trifluoro-3,3-dimethyl-3,4-dihydroisoquinolin-1-yl)quinoline, 3,4,5-trichloropyridine-2,6-dicarbonitrile, 3-[5-(4-chlorophenyl)-2,3-dimethyl-1,2-oxazolidin-3-yl]pyridine, 3-chloro-5-(4-chlorophenyl)-4-(2,6-difluorophenyl)-6-methylpyridazine, 4-(4-chlorophenyl)-5-(2,6-difluorophenyl)-3,6-dimethylpyridazine, 5-amino-1,3,4-thiadiazole-2-thiol, 5-chloro-N'-phenyl-N'-(prop-2-yn-1-yl)thiophene-2-sulfonohydrazide, 5-fluoro-2-[(4-fluorobenzyl)oxy]pyrimidin-4-amine, 5-fluoro-2-[(4-methylbenzyl)oxy]pyrimidin-4-amine, 5-methyl-6-octyl[1,2,4]triazolo[1,5-a]pyrimidin-7-amine, ethyl (2Z)-3-amino-2-cyano-3-phenylprop-2-enoate, N'-(4-{[3-(4-chlorobenzyl)-1,2,4-thiadiazol-5-yl]oxy}-2,5-dimethylphenyl)-N-ethyl-N-methylimidoformamide, N-(4-chlorobenzyl)-3-[3-methoxy-4-(prop-2-yn-1-yloxy)phenyl]propanamide, N-[(4-chlorophenyl)(cyano)methyl]-3-[3-methoxy-4-(prop-2-yn-1-yloxy)phenyl]propanamide, N-[(5-bromo-3-chloropyridin-2-yl)methyl]-2,4-dichloropyridine-3-carboxamide, N-[1-(5-bromo-3-chloropyridin-2-yl)ethyl]-2,4-dichloropyridine-3-carboxamide, N-[1-(5-bromo-3-chloropyridin-2-yl)ethyl]-2-fluoro-4-iodopyridine-3-carboxamide, N-{(E)-[(cyclopropylmethoxy)imino][6-(difluoromethoxy)-2,3-difluorophenyl]methyl}-2-phenylacetamide, N-{(Z)-[(cyclopropylmethoxy)imino][6-(difluoromethoxy)-2,3-difluorophenyl]methyl}-2-phenylacetamide, N'-{4-[(3-tert-butyl-4-cyano-1,2-thiazol-5-yl)oxy]-2-chloro-5-methylphenyl}-N-ethyl-N-methylimidoformamide, N-methyl-2-(1-{[5-methyl-3-(trifluoromethyl)-1H-pyrazol-1-yl]acetyl}piperidin-4-yl)-N-(1,2,3,4-tetrahydronaphthalen-1-yl)-1,3-thiazole-4-carboxamide, N-methyl-2-(1-{[5-methyl-3-(trifluoromethyl)-1H-pyrazol-1-yl]

acetyl}piperidin-4-yl)-N-[(1R)-1,2,3,4-tetrahydronaphthalen-1-yl]-1,3-thiazole-4-carboxamide, N-methyl-2-(1-{[5-methyl-3-(trifluoromethyl)-1H-pyrazol-1-yl]acetyl}piperidin-4-yl)-N-[(1S)-1,2,3,4-tetrahydronaphthalen-1-yl]-1,3-thiazole-4-carboxamide, pentyl {6-[({[(1-methyl-1H-tetrazol-5-yl)(phenyl)methylidene]amino}oxy)methyl]pyridin-2-yl}carbamate, phenazine-1-carboxylic acid, quinolin-8-ol, quinolin-8-ol sulfate (2:1) and tert-butyl {6-[({[(1-methyl-1H-tetrazol-5-yl)(phenyl)methylene]amino}oxy)methyl]pyridin-2-yl}carbamate.

(16) Further compounds, for example 1-methyl-3-(trifluoromethyl)-N-[2'-(trifluoromethyl)biphenyl-2-yl]-1H-pyrazole-4-carboxamide, N-(4'-chlorobiphenyl-2-yl)-3-(difluoromethyl)-1-methyl-1H-pyrazole-4-carboxamide, N-(2',4'-dichlorobiphenyl-2-yl)-3-(difluoromethyl)-1-methyl-1H-pyrazole-4-carboxamide, 3-(difluoromethyl)-1-methyl-N-[4'-(trifluoromethyl)biphenyl-2-yl]-1H-pyrazole-4-carboxamide, N-(2',5'-difluorobiphenyl-2-yl)-1-methyl-3-(trifluoromethyl)-1H-pyrazole-4-carboxamide, 3-(difluoromethyl)-1-methyl-N-[4'-(prop-1-yn-1-yl)biphenyl-2-yl]-1H-pyrazole-4-carboxamide, 5-fluoro-1,3-dimethyl-N-[4'-(prop-1-yn-1-yl)biphenyl-2-yl]-1H-pyrazole-4-carboxamide, 2-chloro-N-[4'-(prop-1-yn-1-yl)biphenyl-2-yl]pyridine-3-carboxamide, 3-(difluoromethyl)-N-[4'-(3,3-dimethylbut-1-yn-1-yl)biphenyl-2-yl]-1-methyl-1H-pyrazole-4-carboxamide, N-[4'-(3,3-dimethylbut-1-yn-1-yl)biphenyl-2-yl]-5-fluoro-1,3-dimethyl-1H-pyrazole-4-carboxamide, 3-(difluoromethyl)-N-(4'-ethynylbiphenyl-2-yl)-1-methyl-1H-pyrazole-4-carboxamide, N-(4'-ethynylbiphenyl-2-yl)-5-fluoro-1,3-dimethyl-1H-pyrazole-4-carboxamide, 2-chloro-N-(4'-ethynylbiphenyl-2-yl)pyridine-3-carboxamide, 2-chloro-N-[4'-(3,3-dimethylbut-1-yn-1-yl)biphenyl-2-yl]pyridine-3-carboxamide, 4-(difluoromethyl)-2-methyl-N-[4'-(trifluoromethyl)biphenyl-2-yl]-1,3-thiazole-5-carboxamide, 5-fluoro-N-[4'-(3-hydroxy-3-methylbut-1-yn-1-yl)biphenyl-2-yl]-1,3-dimethyl-1H-pyrazole-4-carboxamide, 2-chloro-N-[4'-(3-hydroxy-3-methylbut-1-yn-1-yl)biphenyl-2-yl]pyridine-3-carboxamide, 3-(difluoromethyl)-N-[4'-(3-methoxy-3-methylbut-1-yn-1-yl)biphenyl-2-yl]-1-methyl-1H-pyrazole-4-carboxamide, 5-fluoro-N-[4'-(3-methoxy-3-methylbut-1-yn-1-yl)biphenyl-2-yl]-1,3-dimethyl-1H-pyrazole-4-carboxamide, 2-chloro-N-[4'-(3-methoxy-3-methylbut-1-yn-1-yl)biphenyl-2-yl]pyridine-3-carboxamide, (5-bromo-2-methoxy-4-methylpyridin-3-yl)(2,3,4-trimethoxy-6-methylphenyl)methanone, N-[2-(4-{[3-(4-chlorophenyl)prop-2-yn-1-yl]oxy}-3-methoxyphenyl)ethyl]-N2-(methylsulfonyl)valinamide, 4-oxo-4-[(2-phenylethyl)amino]butanoic acid and but-3-yn-1-yl {6-[({[(Z)-(1-methyl-1H-tetrazol-5-yl)(phenyl)methylene]amino}oxy)methyl]pyridin-2-yl}carbamate.

All pesticides (1) to (16) mentioned may, when they are capable on account of their functional groups, optionally form salts with suitable bases or acids.

Examples of bactericides include the following: bronopol, dichlorophen, nitrapyrin, nickel dimethyldithiocarbamate, kasugamycin, octhilinon, furancarboxylic acid, oxytetracycline, probenazole, streptomycin, tecloftalam, copper sulfate and other copper preparations.

Examples of insecticides, acaricides and nematicides include the following:

(1) Acetylcholinesterase (AChE) inhibitors, such as, for example, carbamates, for example alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb; or organophosphates, for example acephate, azamethiphos, azinphos (-methyl, -ethyl), cadusafos, chlorethoxyfos, chlorfenvinphos, chlormephos, chlorpyrifos (-methyl), coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion (-methyl), phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(2) GABA-gated chloride channel antagonists, for example cyclodiene-organochlorines, e.g. chlordane and endosulfan; or phenylpyrazoles (fiproles), e.g. ethiprole and fipronil.

(3) Sodium channel modulators/voltage-gated sodium channel blockers, for example pyrethroids, e.g. acrinathrin, allethrin, d-cis-trans allethrin, d-trans allethrin, bifenthrin, bioallethrin, bioallethrin s-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans isomers], deltamethrin, empenthrin [(EZ)-(1R) isomers], esfenvalerate, etofenprox, fenpropathrin, fenvalerate, flucythrinate, flumethrin, tau-fluvalinate, halfenprox, imiprothrin, kadethrin, permethrin, phenothrin [(1R)-trans isomer], prallethrin, pyrethrins (pyrethrum), resmethrin, silafluofen, tefluthrin, tetramethrin, tetramethrin [(1R) isomers)], tralomethrin and transfluthrin; or DDT; or methoxychlor.

(4) Nicotinergic acetylcholine receptor (nAChR) agonists, for example neonicotinoids, e.g. acetamiprid, clothianidin, dinotefuran, imidacloprid, nitenpyram, thiacloprid and thiamethoxam; or nicotine.

(5) Allosteric activators of the nicotinergic acetylcholine receptor (nAChR), for example spinosyns, e.g. spinetoram and spinosad.

(6) Chloride channel activators, for example avermectins/milbemycins, e.g. abamectin, emamectin benzoate, lepimectin and milbemectin.

(7) Juvenile hormone imitators, for example juvenile hormone analogs, e.g. hydroprene, kinoprene and methoprene; or fenoxycarb; or pyriproxyfen.

(8) Active ingredients with unknown or nonspecific mechanisms of action, for example alkyl halides, e.g. methyl bromide and other alkyl halides; or chloropicrin; or sulfuryl fluoride; or borax; or tartar emetic.

(9) Selective antifeedants, for example pymetrozine; or flonicamid.

(10) Mite growth inhibitors, for example clofentezine, hexythiazox and diflovidazin; or etoxazole.

(11) Microbial disruptors of the insect gut membrane, such as, for example, *Bacillus thuringiensis* subspecies *israelensis*, *Bacillus sphaericus*, *Bacillus thuringiensis* subspecies *aizawai*, *Bacillus thuringiensis* subspecies *kurstaki*, *Bacillus thuringiensis* subspecies *tenebrionis*, and BT plant proteins: Cry1Ab, Cry1Ac, Cry1Fa, Cry2Ab, mCry3A, Cry3Ab, Cry3Bb, Cry34/35Ab1.

(12) Oxidative phosphorylation inhibitors, ATP disruptors, for example diafenthiuron; or organotin compounds, e.g. azocyclotin, cyhexatin and fenbutatin oxide; or propargite; or tetradifon.

(13) Oxidative phosphorylation decouplers that interrupt the H proton gradient, for example chlorfenapyr, DNOC and sulfluramid.

(14) Nicotinergic acetylcholine receptor antagonists, for example bensultap, cartap hydrochloride, thiocyclam, and thiosultap-sodium.

(15) Chitin biosynthesis inhibitors, type 0, for example bistrifluron, chlorfluazuron, diflubenzuron, flucycloxuron, flufenoxuron, hexaflumuron, lufenuron, novaluron, noviflumuron, teflubenzuron and triflumuron.

(16) Chitin biosynthesis inhibitors, type 1, such as, for example, buprofezin.

(17) Molting disruptors, dipteran, such as, for example, cyromazine.

(18) Ecdysone receptor agonists, for example chromafenozide, halofenozide, methoxyfenozide and tebufenozide.

(19) Octopaminergic agonists, such as, for example, amitraz.

(20) Complex-Ill electron transport inhibitors, for example hydramethylnon; or acequinocyl; or fluacrypyrim.

(21) Complex-I electron transport inhibitors, for example METI acaricides, e.g. fenazaquin, fenpyroximate, pyrimidifen, pyridaben, tebufenpyrad and tolfenpyrad; or rotenone (Derris).

(22) Voltage-dependent sodium channel blockers, for example indoxacarb; or metaflumizone.

(23) Inhibitors of acetyl-CoA carboxylase, for example tetronic and tetramic acid derivatives, e.g. spirodiclofen, spiromesifen and spirotetramat.

(24) Complex-IV electron transport inhibitors, for example phosphines, e.g. aluminum phosphide, calcium phosphide, phosphine and zinc phosphide; or cyanide.

(25) Complex-II electron transport inhibitors, for example cyenopyrafen.

(28) Ryanodine receptor effectors, for example diamides, e.g. chlorantraniliprole and flubendiamide.

Further active ingredients with an unknown mechanism of action, for example amidoflumet, azadirachtin, benclothiaz, benzoximate, bifenazate, bromopropylate, chinomethionat, cryolite, cyantraniliprole (Cyazypyr), cyflumetofen, dicofol, diflovidazin, fluensulfone, flufenerim, flufiprole, fluopyram, fufenozide, imidaclothiz, iprodione, pyridalyl, pyrifluquinazon and iodomethane; and additionally preparations based on Bacillus firmus (1-1582, BioNeem, Votivo) and the following known active compounds:

3-bromo-N-{2-bromo-4-chloro-6-[(1-cyclopropylethyl) carbamoyl]phenyl}-1-(3-chloropyridin-2-yl)-1H-pyrazole-5-carboxamide (known from WO 2005/077934), 4-{[(6-bromopyrid-3-yl)methyl](2-fluoroethyl)amino}furan-2 (5H)-one (known from WO 2007/115644), 4-{[(6-fluoropyrid-3-yl)methyl](2,2-difluoroethyl)amino}furan-2 (5H)-one (known from WO 2007/115644), 4-{[(2-chloro-1, 3-thiazol-5-yl)methyl](2-fluoroethyl)amino}furan-2(5H)-one (known from WO 2007/115644), 4-{[(6-chloropyrid-3-yl)methyl](2-fluoroethyl)amino}furan-2(5H)-one (known from WO 2007/115644), 4-{[(6-chloropyrid-3-yl)methyl](2, 2-difluoroethyl)amino}furan-2(5H)-one (known from WO 2007/115644), 4-{[(6-chloro-5-fluoropyrid-3-yl)methyl] (methyl)amino}furan-2(5H)-one (known from WO 2007/ 115643), 4-{[(5,6-dichloropyrid-3-yl)methyl](2-fluoroethyl)amino}furan-2(5H)-one (known from WO 2007/ 115646), 4-{[(6-chloro-5-fluoropyrid-3-yl)methyl] (cyclopropyl)amino}furan-2(5H)-one (known from WO 2007/115643), 4-{[(6-chloropyrid-3-yl)methyl](cyclopropyl)amino}furan-2(5H)-one (known from EP-A 0 539 588), 4-{[(6-chloropyrid-3-yl)methyl](methyl)amino}furan-2 (5H)-one (known from EP-A 0 539 588), {[1-(6-chloropyridin-3-yl)ethyl](methyl)oxido-λ4-sulfanylidene}cyanamide (known from WO 2007/149134) and its diastereomers {[(1R)-1-(6-chloropyridin-3-yl)ethyl](methyl)oxido-λ4-sulfanylidene}cyanamide (A) and {[(1S)-1-(6-chloropyridin-3-yl)ethyl](methyl)oxido-λ4-sulfanylidene}cyanamide (B) (likewise known from WO 2007/149134) and also sulfoxaflor (likewise known from WO 2007/149134) and its diastereomers [(R)-methyl(oxido){(1R)-1-[6-(trifluoromethyl)pyridin-3-yl]ethyl}-λ4-sulfanylidene]cyanamide (λ1) and [(S)-methyl(oxido){(1S)-1-[6-(trifluoromethyl)pyridin-3-yl]ethyl}-λ4-sulfanylidene]cyanamide (A2), identified as diastereomer group A (known from WO 2010/074747, WO 2010/074751), [(R)-methyl(oxido){(1S)-1-[6-(trifluoromethyl)pyridin-3-yl]ethyl}-λ4-sulfanylidene]cyanamide (B1) and [(S)-methyl(oxido){(1R)-1-[6-(trifluoromethyl)pyridin-3-yl]ethyl}-λ4-sulfanylidene]cyanamide (B2), identified as diastereomer group B (likewise known from WO 2010/ 074747, WO 2010/074751) and 11-(4-chloro-2,6-dimethylphenyl)-12-hydroxy-1,4-dioxa-9-azadispiro[4.2.4.2]tetradec-11-en-10-one (known from WO 2006/089633), 3-(4'-fluoro-2,4-dimethylbiphenyl-3-yl)-4-hydroxy-8-oxa-1-azaspiro[4.5]dec-3-en-2-one (known from WO 2008/ 067911), 1-{2-fluoro-4-methyl-5-[(2,2,2-trifluoroethyl) sulfinyl]phenyl}-3-(trifluoromethyl)-1H-1,2,4-triazol-5-amine (known from WO 2006/043635), [(3S,4aR,12R,12aS, 12bS)-3-[(cyclopropylcarbonyl)oxy]-6,12-dihydroxy-4, 12b-dimethyl-11-oxo-9-(pyridin-3-yl)-1,3,4,4a,5,6,6a,12, 12a,12b-decahydro-2H,11H-benzo[f]pyrano[4,3-b] chromen-4-yl]methyl cyclopropanecarboxylate (known from WO 2008/066153), 2-cyano-3-(difluoromethoxy)-N, N-dimethylbenzenesulfonamide (known from WO 2006/ 056433), 2-cyano-3-(difluoromethoxy)-N-methylbenzenesulfonamide (known from WO 2006/100288), 2-cyano-3-(difluoromethoxy)-N-ethylbenzenesulfonamide (known from WO 2005/035486), 4-(difluoromethoxy)-N-ethyl-N-methyl-1,2-benzothiazol-3-amine 1,1-dioxide (known from WO 2007/057407), N-[1-(2,3-dimethylphenyl)-2-(3,5-dimethylphenyl)ethyl]-4,5-dihydro-1,3-thiazol-2-amine (known from WO 2008/104503), {1'-[(2E)-3-(4-chlorophenyl)prop-2-en-1-yl]-5-fluorospiro[indole-3,4'-piperidin]-1(2H)-yl} (2-chloropyridin-4-yl)methanone (known from WO 2003/ 106457), 3-(2,5-dimethylphenyl)-4-hydroxy-8-methoxy-1, 8-diazaspiro[4.5]dec-3-en-2-one (known from WO 2009/ 049851), 3-(2,5-dimethylphenyl)-8-methoxy-2-oxo-1,8-diazaspiro[4.5]dec-3-en-4-yl ethyl carbonate (known from WO 2009/049851), 4-(but-2-yn-1-yloxy)-6-(3,5-dimethylpiperidin-1-yl)-5-fluoropyrimidine (known from WO 2004/099160), (2,2,3,3,4,4,5,5-octafluoropentyl)(3,3,3-trifluoropropyl)malononitrile (known from WO 2005/063094), (2,2,3,3,4,4,5,5-octafluoropentyl)(3,3,4,4,4-pentafluorobutyl)malononitrile (known from WO 2005/063094), 8-[2-(cyclopropylmethoxy)-4-(trifluoromethyl)phenoxy]-3-[6-(trifluoromethyl)pyridazin-3-yl]-3-azabicyclo[3.2.1]octane (known from WO 2007/040280), 2-ethyl-7-methoxy-3-methyl-6-[(2,2,3,3-tetrafluoro-2,3-dihydro-1,4-benzodioxin-6-yl)oxy]quinolin-4-yl methyl carbonate (known from JP2008/110953), 2-ethyl-7-methoxy-3-methyl-6-[(2,2,3,3-tetrafluoro-2,3-dihydro-1,4-benzodioxin-6-yl)oxy]quinolin-4-yl acetate (known from JP2008/ 110953), PF1364 (CAS Reg. No. 1204776-60-2) (known from JP 2010/018586), 5-[5-(3,5-dichlorophenyl)-5-(trifluoromethyl)-4,5-dihydro-1,2-oxazol-3-yl]-2-(1H-1,2,4-triazol-1-yl)benzonitrile (known from WO 2007/075459), 5-[5-(2-chloropyridin-4-yl)-5-(trifluoromethyl)-4,5-dihydro-1,2-oxazol-3-yl]-2-(1H-1,2,4-triazol-1-yl)benzonitrile (known from WO 2007/075459), 4-[5-(3,5-dichlorophenyl)-5-(trifluoromethyl)-4,5-dihydro-1,2-oxazol-3-yl]-2-methyl-N-{2-oxo-2-[(2,2,2-trifluoroethyl)amino]ethyl}benzamide (known from WO 2005/085216), 4-{[(6-chloropyridin-3-yl)methyl](cyclopropyl)amino}-1,3-oxazol-2(5H)-one, 4-{[(6-chloropyridin-3-yl)methyl](2,2-difluoroethyl)amino}-1,3-oxazol-2(5H)-one, 4-{[(6-chloropyridin-3-yl)methyl](ethyl)amino}-1,3-oxazol-2 (5H)-one, 4-{[(6-chloropyridin-3-yl)methyl](methyl)amino}-1,3-oxazol-2(5H)-one (all known from WO 2010/005692), NNI-0711 (known from WO2002/096882), 1-acetyl-N-[4-(1,1,1,3,3,3-hexafluoro-2-methoxypropan-2-yl)-3-isobutylphenyl]-N-isobutyryl-3,5-dimethyl-1H-pyrazole-4-carboxamide (known from WO 2002/096882), methyl 2-[2-({[3-bromo-1-(3-chloropyridin-2-yl)-1H-pyrazol-5-yl]carbonyl}amino)-5-chloro-3-methylbenzoyl]-2-methylhydrazinecarboxylate (known from WO 2005/085216), methyl 2-[2-({[3-bromo-1-(3-chloropyridin-2-yl)-1H-pyrazol-5-yl]carbonyl}amino)-5-cyano-3-methylbenzoyl]-2-ethylhydrazinecarboxylate (known from WO 2005/085216), methyl 2-[2-({[3-bromo-1-(3-chloropyridin-2-yl)-1H-pyrazol-5-yl]carbonyl}amino)-5-cyano-3-methylbenzoyl]-2-methylhydrazinecarboxylate (known from WO 2005/085216), methyl 2-[3,5-dibromo-2-({[3-bromo-1-(3-chloropyridin-2-yl)-1H-pyrazol-5-yl]carbonyl}amino)benzoyl]-1,2-diethylhydrazinecarboxylate (known from WO 2005/085216), methyl 2-[3,5-dibromo-2-({[3-bromo-1-(3-chloropyridin-2-yl)-1H-pyrazol-5-yl]carbonyl}amino)benzoyl]-2-ethylhydrazinecarboxylate (known from WO 2005/085216), (5RS,7RS;5RS,7SR)-1-(6-chloro-3-pyridylmethyl)-1,2,3,5,6,7-hexahydro-7-methyl-8-nitro-5-propoxyimidazo[1,2-a]pyridine (known from WO 2007/101369), 2-{6-[2-(5-fluoropyridin-3-yl)-1,3-thiazol-5-yl]pyridin-2-yl}pyrimidine (known from WO 2010/006713), 2-{6-[2-(pyridin-3-yl)-1,3-thiazol-5-yl]pyridin-2-yl}pyrimidine (known from WO 2010/006713), 1-(3-chloropyridin-2-yl)-N-[4-cyano-2-methyl-6-(methylcarbamoyl)phenyl]-3-{[5-(trifluoromethyl)-1H-tetrazol-1-yl]methyl}-1H-pyrazole-5-carboxamide (known from WO 2010/069502), 1-(3-chloropyridin-2-yl)-N-[4-cyano-2-methyl-6-(methylcarbamoyl)phenyl]-3-{[5-(trifluoromethyl)-2H-tetrazol-2-yl]methyl}-1H-pyrazole-5-carboxamide (known from WO 2010/069502), N-[2-(tert-butylcarbamoyl)-4-cyano-6-methylphenyl]-1-(3-chloropyridin-2-yl)-3-{[5-(trifluoromethyl)-1H-tetrazol-1-yl]methyl}-1H-pyrazole-5-carboxamide (known from WO 2010/069502), N-[2-(tert-butylcarbamoyl)-4-cyano-6-methylphenyl]-1-(3-chloropyridin-2-yl)-3-{[5-(trifluoromethyl)-2H-tetrazol-2-yl]methyl}-1H-pyrazole-5-carboxamide (known from WO 2010/069502), and (1E)-N-[(6-chloropyridin-3-yl)methyl]-N'-cyano-N-(2,2-difluoroethyl)ethanimideamide (known from WO 2008/009360).

The active ingredients identified here by their common name are known and are described, for example, in the pesticide handbook ("The Pesticide Manual" 16$^{th}$ Ed., British Crop Protection Council 2012) or can be searched for on the Internet (e.g. http://www.alanwood.net/pesticides).

The pesticides of components c) and/or d) may also be a combination of two or more pesticides. Such combinations are of significance especially when the aim is, for example, to broaden the spectrum of action of the pesticide composition or to better suppress resistances to particular pesticides.

The combination of two or more pesticides in one formulation is a difficult undertaking. The active ingredients are typically incompatible with one another and the aqueous mixtures are therefore not phase-stable. However, the adjuvant compositions of the invention are of good suitability for stabilization of such basically incompatible compositions.

In a further embodiment of the invention, the pesticide compositions of the invention therefore comprise at least two water-soluble pesticides of component c).

Preference is further given to compositions comprising one or more water-insoluble active ingredients d).

The aim in the formulation of aqueous active ingredient compositions is to load the composition with a maximum concentration of active ingredient. This reduces packaging, transport, storage and disposal costs. Therefore, an adjuvant composition should be capable of enabling stable high-load active ingredient compositions, called "high-load formulations". This is possible in a surprisingly efficient manner with the surfactants of component a), optionally in combination with the alkylglucamides of the formula (I) of component e).

In a preferred embodiment of the invention, the amount of the one or more active ingredients of components c) and/or d) in the compositions of the invention is more than 100 g/L, more preferably more than 200 g/L, even more preferably more than 300 g/L and especially preferably more than 400 g/L. These figures are based on the total weight of the active ingredient composition of the invention and, in the case of active ingredients which are used in the form of their water-soluble salts (such as typically glyphosate or 2,4-D, for example), on the amount of free acid, called the acid equivalent (a.e.).

In a further preferred embodiment of the invention, the amount of the one or more surfactants of component a) in the active ingredient compositions of the invention is 20 to 600 g/L, preferably 40 to 300 g/L and more preferably 50 to 150 g/L. These figures are based on the total amount of the active ingredient composition of the invention.

Preference is given to compositions which take the form of a concentrate formulation, which are diluted prior to use and contain 5% to 80% by weight, preferably 10% to 70% by weight and more preferably 20% to 60% by weight of the one or more active ingredients of component c) and/or d).

Preference is likewise given to compositions which take the form of a spray liquor and which contain 0.001% to 10% by weight, preferably 0.02% to 3% by weight and more preferably 0.025% to 2% by weight of the one or more active ingredients of component c) and/or d).

Any further auxiliaries h) present in the compositions of the invention are compounds known to the person skilled in the art of formulation. The compositions of the invention preferably comprise one or more auxiliaries h) of this kind.

The content of component h) is preferably 1% to 50% by weight, more preferably 2% to 30% by weight and especially preferably 2% to 15% by weight. The stated amounts are based on the total amount of these auxiliaries in a formulation, based on the total weight of the formulation. The amounts of component h) can of course be correspondingly lowered by dilution prior to application.

The compositions of the invention may optionally comprise further customary formulation auxiliaries as component h). Examples of these are nonpolar solvents, inert materials such as stickers, wetters, dispersants, emulsifiers, penetrants, preservatives, fillers, carriers and dyes, and agents that affect the pH (buffers, acids and bases) or the viscosity (e.g. thickeners), functional polymers, further adjuvants and/or defoamers. Customary formulation auxiliaries h) are, for example, said inert materials, evaporation inhibitors, preservatives and/or dyes.

Preferably, the compositions of the invention comprise one or more of the aforementioned components h).

A preferred group of auxiliaries h) is that of further surfactants. The surfactants are anion-active, nonionic, cation-active and/or zwitterionic surfactants other than the surfactants of components a) and e). Examples of such surfactants are listed below (where, in each case, EO=ethylene oxide units, PO=propylene oxide units and BO=butylene oxide units from the preparation point of view, or corresponding alkyleneoxy units in the surfactant molecules):

It is possible to use anion-active surfactants, for example:
1) anionic derivatives of fatty alcohols having 10-24 carbon atoms with 0-60 EO and/or 0-20 PO and/or 0-15 BO in any sequence in the form of ether carboxylates, sulfonates, sulfates and phosphates and the inorganic (e.g. alkali metal and alkaline earth metal) and organic salts (for example based on amine or alkanolamine) thereof, such as Genapol® LRO, Sandopae products, Hostaphat/Hordaphos® products from Clariant;
2) anionic derivatives of copolymers consisting of EO, PO and/or BO units with a molecular weight of 400 to $10^8$ in the form of ether carboxylates, sulfonates, sulfates and phosphates and the inorganic (e.g. alkali metal and alkaline earth metal) and organic salts (for example based on amine or alkanolamine) thereof;
3) anionic derivatives of alkylene oxide adducts of $C_1$-$C_9$ alcohols in the form of ether carboxylates, sulfonates, sulfates and phosphates and the inorganic (e.g. alkali metal and alkaline earth metal) and organic salts (for example based on amine or alkanolamine) thereof, provided that their structures are not covered by the definition of the alkyl ether sulfates of component (c); d1-4) anionic derivatives of fatty acid alkoxylates in the form of ether carboxylates, sulfonates, sulfates and phosphates and the inorganic (e.g. alkali metal and alkaline earth metal) and organic salts (for example based on amine or alkanolamine) thereof;

It is possible to use cation-active or zwitterionic surfactants, for example:
1) alkylene oxide adducts of fatty amines, quaternary ammonium compounds having 8 to 22 carbon atoms ($C_8$-$C_{22}$), for example the Genamin® C, L, O, T products;
2) surface-active zwitterionic compounds such as taurides, betaines and sulfobetaines in the form of Tegotain® products, Hostapon® T and Arkopon® T products.

It is also possible to use nonionic surfactants, for example:
1) fatty alcohols having 8-24 carbon atoms with 0-60 EO and/or 0-20 PO and/or 0-15 BO in any sequence. Examples of such compounds are Genapol® C, L, O, T, UD, UDD, X products, Plurafac® and Lutensol® A, AT, ON, TO products, Marlipal® 24 and 013 products, Dehypon® products, Ethylan® products, such as Ethylan CD 120;
2) fatty acid alkoxylates and triglyceride alkoxylates such as the Serdox® NOG products or the Emulsogen® products;
3) fatty acid amide alkoxylates such as the Comperlan® products;
4) alkylene oxide adducts of alkynediols such as the Surfynol® products; sugar derivatives such as amino and amido sugars;
5) glucitols;
6) silicon- or silane-based surface-active compounds such as the Tegopren® products and the SE® products, and the Bevaloid®, Rhodorsil® and Silcolapse® products;
7) interface-active sulfonamides;
8) interface-active polyacryloyl and polymethacryloyl derivatives such as the Sokalan® products;
9) surface-active polyamides such as modified gelatin or derivatized polyaspartic acid and derivatives thereof;
10) surfactant polyvinyl compounds such as modified PVP, such as the Luviskol® products and the Agrimer® products, or the derivatized polyvinyl acetates such as the Mowilith® products or the polyvinyl butyrates such as the Lutonal® products, the Vinnapas® and the Pioloform® products or modified polyvinyl alcohols such as the Mowiol® products;
11) surface-active polymers based on maleic anhydride and/or reaction products of maleic anhydride and maleic anhydride and/or reaction products of maleic anhydride-containing copolymers such as the Agrimer®-VEMA products;
12) surface-active derivatives of montan waxes, polyethylene waxes and polypropylene waxes, such as the Hoechst® waxes or the Licowet® and Licowax® products;
13) polyol-based alkylene oxide adducts such as Polyglykol® products;
14) interface-active polyglycerides and derivatives thereof;
15) alkyl polysaccharides and mixtures thereof, for example from the Atplus® series, preferably Atplus 435;
16) alkyl polyglucosides in the form of the Agnique®-PG products, for example © Agnique®-PG 8107 (fatty alcohol $C_8$-$C_{10}$-glucoside);
17) sorbitan esters in the form of the Span® or Tween® products;
18) cyclodextrin esters or ethers;
19) surface-active cellulose and algin, pectin and guar derivatives such as the Tylose® products, the Manutex® products and guar derivatives;
20) alkyl polyglycoside/alkyl polysaccharide mixtures based on $C_8$-$C_{10}$ fatty alcohol, such as Glucopon® 225 DK and Glucopon® 215 CSUP.

Preferred surfactants of component h) are anion-active surfactants, particular preference being given to alkyl polyglycol ether sulfates, especially preferably fatty alcohol diethylene glycol ether sulfate (e.g. Genapol LRO®, Clariant), or alkyl polyglycol ether carboxylates (e.g. 2-(isotridecyloxypolyethyleneoxy)ethyl carboxymethyl ether, Marlowet 4538®, Hüls), where the content and nature of the additional anionic surfactants is appropriately chosen so as not to result in unacceptable foaming characteristics of the formulation.

Preferably, the compositions of the invention comprise defoamers, dyes and agents that affect the pH as formulation auxiliaries h).

Further possible components h) are nonpolar organic solvents or nonpolar inorganic solvents or mixtures thereof.

Examples of nonpolar solvents in the context of the invention are
 aliphatic or aromatic hydrocarbons, for example mineral oils or toluene, xylenes and naphthalene derivatives,
 halogenated aliphatic or aromatic hydrocarbons, such as methylene chloride or chlorobenzene,
 oils, for example vegetable-based oils such as corn kernel oil and rapeseed oil, or oil derivatives such as rapeseed oil methyl ester.

The compositions of the invention may comprise defoamers as component h). The defoamers may be a single defoamer or a mixture of two or more defoamers. Suitable defoamers are fatty acid alkyl ester alkoxylates, organopolysiloxanes such as polydimethylsiloxanes and mixtures thereof with microfine, optionally silanized silica, perfluoroalkylphosphonates, perfluoroalkylphosphinates, paraffins, waxes and microcrystalline waxes, and mixtures thereof with silanized silica. Also advantageous are mixtures of various foam inhibitors, for example those of silicone oil, paraffin oil and/or waxes.

The compositions of the invention may optionally comprise preservatives as component h). The preservatives may be a single preservative or a mixture of two or more preservatives. Preservatives used may be organic acids and esters thereof, for example ascorbic acid, ascorbyl palmitate, sorbate, benzoic acid, methyl 4-hydroxybenzoate, propyl 4-hydroxybenzoate, propionates, phenol, 2-phenylphenate, 1,2-benzisothiazolin-3-one, formaldehyde, sulfurous acid and salts thereof. Examples include Mergal K9N® (Riedel) or Cobate C®.

The compositions of the invention may optionally comprise drift retardants as component h). The drift retardants may be a single drift retardant or a mixture of two or more drift retardants. Drift retardants used may be water-soluble polymers, for example polyglycerol esters, polyacrylamides, acrylamide/acrylic acid polymers, sodium polyacrylate, carboxymethyl cellulose, hydroxyethyl cellulose, methyl cellulose, polysaccharides, natural and synthetic guar gum. In addition, it is also possible to use particular emulsions or self-emulsifying systems as drift retardants. Examples here include Synergen® OS from Clariant or InterLock® (Winfield).

The functional polymers which may be present as component h) in the composition of the invention are high molecular weight compounds of synthetic or natural origin having a molar mass of greater than 10 000. The functional polymers may act, for example, as anti-drift agents or increase rain resistance.

In a further preferred embodiment of the invention, the compositions of the invention comprise, as well as components a) to d) and optionally e) to g), as component h), one or more further adjuvants as usable in a known manner in aqueous active ingredient compositions.

These are preferably fatty amine ethoxylates, etheramine ethoxylates, alkyl betaines or amidoalkyl betaines, amine oxides or amidoalkylamine oxides, alkyl polyglycosides or copolymers of glycerol, coconut fatty acid and phthalic acid.

These adjuvants are known from the literature as adjuvants in aqueous pesticide compositions and are described, for example, in WO2009/029561.

The compositions of the invention, in the form of concentrates, may contain up to 50% by weight of one or more formulation auxiliaries of component h), preferably up to 30% by weight and more preferably up to 15% by weight. The figures given here are based on the total weight of the composition. The amounts of component h) can of course be correspondingly lowered by dilution prior to application.

The pH of the compositions of the invention is typically within the range from 3.5 to 8.5, preferably 4.0 to 8.0 and more preferably 4.5 to 6.5 (measured as a 1% by weight aqueous dilution). The pH is determined primarily by the pH values of the solutions of the aqueous active ingredients, which take the form of salts of weak acids. By adding acids or bases, it is possible to adjust the pH to another value different than the original pH of the mixture.

In a further preferred embodiment of the invention, the compositions of the invention take the form of concentrate formulations which are diluted prior to use, especially with water (for example "ready-to-use", "in-can" or "built-in" formulations), and contain the one or more water-soluble active ingredient(s) of component d1) generally in amounts of 5% to 80% by weight, preferably of 10% to 70% by weight and more preferably of 20% to 60% by weight. These figures are based on the overall concentrate formulation and, in the case of pesticides which are used in the form of their water-soluble salts, on the amount of free acid, called the acid equivalent (a.e.).

The active ingredient compositions of the invention are preferably deployed to the fields in the form of spray liquors. The spray liquors are produced by diluting concentrate formulations with a defined amount of water.

The invention further relates to the use of the above-described adjuvant composition for improving plant wettability by a reduction in dynamic surface tension, especially of active ingredient compositions having a high electrolyte content.

The invention also relates to the use of the above-described adjuvant composition for improving the wetting capacity of topically applicable active ingredient compositions, especially of leaf-applicable active ingredient compositions.

The adjuvant compositions of the invention are preferably used for production of aqueous active ingredient compositions.

Particular preference is given to the use of active agrochemical ingredients, preferably pesticides, more preferably water-soluble pesticides and most preferably water-soluble herbicides.

The above-described compositions are also used for control and/or for abatement of unwanted plant growth, fungal disorders or insect infestation in plants, preferably for control and/or for abatement of unwanted plant growth.

These uses can preferably also take place in what is known as the tankmix method. In this case, the one or more water-soluble pesticides of component d1) and components a) to c) may thus also take the form of a "tankmix" preparation. In such a preparation, both the one or more water-soluble pesticides c) and components a) to b) are present separately from one another. The two preparations are mixed with one another prior to deployment, generally shortly beforehand, giving rise to a pesticide composition of the invention.

The invention further relates to a method of protecting plants from harmful organisms, in which the plant, the harmful organisms or their habitat is/are brought into contact with one of the above-described compositions.

The adjuvant compositions of the invention can also be used in non-biological sectors. The combination of properties of low dynamic surface tension and high salt tolerance is desirable, for example, in the field of cleaning compositions.

The invention therefore also relates to the use of the above-described adjuvant composition as additive to cleaning compositions, especially to cleaning compositions for hard surfaces.

WORKING EXAMPLES

Comparative Examples C1-C3 and Examples 1-3

The efficacy of glufosinate-ammonium herbicide was examined, applied in an active ingredient concentration of 400 g in the spray liquid to counter *Rumex* sp. weeds. Emulsogen PF20S was added to the tank. The numerical values reported in table 1 below are the arithmetic mean from three trials in each case.

TABLE 1

| Example | Formulation | Test product | Test product concentration in spray liquor [g/l] | Weed control in % after time [400 g/ha ai] 2 days | 8 days | 15 days |
|---|---|---|---|---|---|---|
|  | Control |  |  | 0.00 | 0.00 | 0.00 |
| C1 | Market standard glufosinate-ammonium SL 200 (2 L/ha) | — |  | 10.00 | 80.00 | 70.00 |
| C2 | Market standard glufosinate-ammonium SL 280 (1.43 L/ha) | — |  | 10.00 | 83.33 | 71.67 |
| C3 | Glufosinate-ammonium SL 280 (1.43 L/ha) | Genapol LRO | 3.2 | 5.00 | 83.33 | 75.00 |
| 1 | Glufosinate-ammonium SL 280 (1.43 L/ha) | Emulsogen PF20S | 0.64 | 16.67 | 85.00 | 85.00 |
| 2 | Glufosinate-ammonium SL 280 (1.43 L/ha) | Emulsogen PF20S | 1.6 | 16.67 | 85.00 | 86.67 |
| 3 | Glufosinate-ammonium SL 280 (1.43 L/ha) | Emulsogen PF20S | 3.2 | 13.33 | 80.00 | 80.00 |

Table 1 shows a higher efficacy of glufosinate-ammonium in the presence of Emulsogen PF20S. The compositions of the invention were quicker and showed the highest and longest weed control. These compositions were better than all market standard products.

The field results listed in table 1 show that polyalkylene glycol ether sulfate salts can be used advantageously in aqueous systems with a high electrolyte content. This also applies to other aqueous preparations comprising polyalkylene glycol ether sulfate salts, such as Emulsogen PF20S, and water-soluble salts or acids of herbicides, such as auxins, glufosinate, glyphosate or mesotrione and combinations thereof. These may be ready-to-use dilutions or concentrates or preliminary solutions thereof. What should be emphasized is the combination of high cloud point (>100° C.), low dynamic surface tension, good plant compatibility and favorable toxicological classification, which promote sustainable use of agrochemicals.

This applies in use as a tankmix adjuvant, but also when Emulsogen PF20 S is incorporated into the formulation. Emulsogen PF20 S forms stable formulations with glyphosate salts and with different further surfactants in various concentrations, and it is possible to work with high electrolyte concentrations. What should be emphasized are the high cloud point (>100° C.) and the low dynamic surface tension of Emulsogen PF20 S. The latter in aqueous solution at a concentration of 0.5 g/L after 200 msec is less than 55 mN/m.

Examples 4-8

Further formulations of glufosinate-ammonium were produced. The individual constituents and the amounts thereof in the individual formulations are listed in table 2 below.

The formulations of examples 4 to 8 are glufosinate SL200 formulations with 5% active substance content of polyalkylene glycol ether sulfate ammonium (=Emulsogen PF20S) and Synergen GA or the alkyl polyglucoside Agnique PG8105. All formulations were stably monophasic and transparent (without cloudiness) in the temperature range between −10° C. (8 weeks), room temperature (8 weeks) and 54° C. (2 weeks). The pH was 6 and was variable within the range of pH 4.5-8.5. Further properties of these formulations are listed in table 2 below.

TABLE 2

|  | Example No. 4 | 5 | 6 | 7 | 8 |
|---|---|---|---|---|---|
| Glufosinate-ammonium (50%) | 35.00 | 35.00 | 35.00 | 35.00 | 35.00 |
| Emulsogen PF20S (50%) | 10.00 | 10.00 | 10.00 | 10.00 | 10.00 |
| Propylene glycol | 10.00 | 10.00 | 10.00 | 10.00 | 10.00 |
| DM water | 36.98 | 33.98 | 33.98 | 31.50 | 29.00 |
| Diammonium hydrogen citrate |  | 1.00 | 1.00 | 1.00 | 1.00 |
| Synergen GA | 8.00 |  | 10.00 |  |  |
| C810 alkyl polyglucoside (Agnique PG8105, BASF) |  | 10.00 |  | 12.50 | 15.00 |
| Momentive SAG 1572 defoamer | 0.02 | 0.02 | 0.02 |  |  |
|  | 100.00 | 100.00 | 100.00 | 100.00 | 100.00 |
| pH (1% formulation, DM water) | 6 | 6 | 6 | 6 | 6 |
| Stability (8 weeks) −10° C. | liquid | liquid | liquid | liquid | liquid |
| Stability (8 weeks) RT (25° C.) | ok | ok | ok | ok | ok |
| Stability (2 weeks) 54° C. | ok | ok | ok | ok | ok |

Example 9

The formulation in this example was a glyphosate-K formulation with an active substance content of polyalkylene glycol ether sulfate-ammonium (=Emulsogen PF20S) and Synergen GL8 (=C810, alkyldimethyl(hydroxyethyl)ammonium chloride). The simple, inexpensive and stable formulation of an SL540 formulation of glyphosate potassium contained 84.5% glyphosate K (58%),
6% Synergen GL8,
3% Emulsogen PF20S (polyalkylene glycol ether sulfate ammonium), and
water to 100%.

It was optionally possible to add defoamer.

The formulation was stably monophasic and transparent (without cloudiness) in the temperature range between −10° C. (8 weeks), room temperature (8 weeks) and 40° C. (8 weeks).

The unadjusted pH was 4.3 and was variable within the range of pH 4.0-8.5.

Example 10

The formulation in this example was a glyphosate-K formulation with an active substance content of polyalkylene glycol ether sulfate-potassium (=Tivogen PFK) and Synergen GL8 (=C810, alkyldimethyl(hydroxyethyl)ammonium chloride).

The simple, inexpensive and stable formulation of an SL540 formulation of glyphosate potassium contained
84.5% glyphosate K (58%),
6% Synergen GL8,
3% Tivogen PFK (polyalkylene glycol ether sulfate potassium), and
water to 100%.

It was optionally possible to add defoamer.

The formulation was stably monophasic and transparent (without cloudiness) in the temperature range between −10° C. (8 weeks), room temperature (8 weeks) and 40° C. (8 weeks). The unadjusted pH was 4.3 and was variable within the range of pH 4.0-8.5.

All formulations of examples 4 to 10 were stable between −10 and +40° C. and, where determined, up to +54° C., and, after dilution with water at active ingredient-typical active herbicidal ingredient concentrations of 1.5-10 g/L glufosinate (acid equivalent) or 5-50 g/L glyphosate (acid equivalent), gave aqueous solutions having dynamic surface tensions below 50 mN/m and hence have excellent wetting properties for monocotyledonous and dicotyledonous weeds and all crop plants.

The invention claimed is:

1. A spray liquor produced by diluting a concentrate formulation with water, the concentrate formulation comprising:
   a) at least one sulfated polyalkylene glycol having the structural formula:

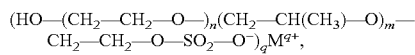

(HO—(CH$_2$—CH$_2$—O—)$_n$(CH$_2$—CH(CH$_3$)—O)$_m$—CH$_2$—CH$_2$—O—SO$_2$—O$^-$)$_q$M$^{q+}$, in which
   n and m are independently in the range of 2 to 40,
   q is 1 or 2, and
   M is mono- or divalent cation,
   wherein the at least one component a) is present in an amount from 2% to 90% by weight, based on the total weight of the concentrate formulation;
   b) water; and
   c) at least one electrolyte dissociated into ions selected from the group consisting of water-soluble salts of glyphosate and water-soluble salts of glufosinate,
   wherein the spray liquor contains at least 0.25 g/L of the at least one sulfated polyalkylene glycol.

2. The spray liquor of claim 1, further comprising at least one water-insoluble active ingredient d).

3. The spray liquor of claim 1, further comprising at least one of components e) to g):
   e) at least one alkylglucamide of the formula (I)

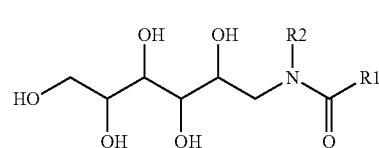

in which
   R1 is a linear or branched alkyl group having 5 to 12 carbon atoms,
   R2 is an alkyl group having 1 to 3 carbon atoms,
   f) propylene glycol, dipropylene glycol, mixtures of propylene glycol and dipropylene glycol, each optionally in a mixture with polypropylene glycol and/or polyethylene glycol, each having up to ten repeat units,
   g) at least one cosolvent, and/or
   h) at least one auxiliary.

4. The spray liquor of claim 2, wherein the at least one water-insoluble active ingredient d) is at least one water-insoluble pesticide.

5. The spray liquor of claim 1, wherein the at least one electrolyte c) is selected from water-soluble salts of glufosinate.

6. The spray liquor of claim 2, further comprising at least one customary formulation auxiliaries h) that are selected from the group consisting of nonpolar solvents, inert materials, stickers, wetters, dispersants, emulsifiers, penetrants, preservatives, fillers, carriers, dyes, agents that affect the pH or the viscosity, functional polymers, further adjuvants, and defoamers.

7. The spray liquor of claim 2, wherein the water-insoluble active ingredient d) is selected from the group consisting of active pharmaceutical ingredients, active agrochemical ingredients, biocides and repellents.

8. The spray liquor of claim 2, further comprising at least one of the following additional components e) to g):
   e) at least one alkylglucamide of the formula (I)

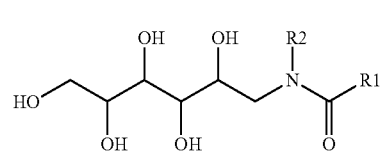

in which
   R1 is a linear or branched alkyl group having 5 to 12 carbon atoms,
   R2 is an alkyl group having 1 to 3 carbon atoms,
   f) propylene glycol, dipropylene glycol, mixtures of propylene glycol and dipropylene glycol, each optionally in a mixture with polypropylene glycol and/or polyethylene glycol, each having up to ten repeat units,
   g) at least one cosolvent, and/or
   h) at least one auxiliary.

9. The spray liquor of claim 1, wherein the at least one electrolyte c) is selected from water-soluble salts of glyphosate.

10. The spray liquor of claim 1, wherein the degree of polymerization of the at least one sulfated polyalkylene glycol is in the range of 5-60 repeat units per molecule.

11. The spray liquor of claim 1, wherein the degree of polymerization of the at least one sulfated polyalkylene glycol is in the range of 10-80 repeat units per molecule.

12. The spray liquor of claim 1, wherein the at least one sulfated polyalkylene glycol is provided as a mixture of oligomers or polymers having different degrees of polymerizations and/or different molecular weights.

13. The spray liquor of claim 1, wherein
the proportion of the at least one sulfated polyalkylene glycol a) in the concentrate is 5% to 60% by weight, based on the total weight of the concentrate;
the proportion of water b) in the concentrate is 20% to 70% by weight, based on the total weight of the concentrate;
the proportion of the at least one electrolyte c) in the concentrate is 10% to 70% by weight, based on the total weight of the concentrate.

14. The spray liquor of claim 1, wherein the spray liquor comprises 0.001% to 10% by weight of the at least one electrolyte c).

15. The spray liquor of claim 1, wherein the spray liquor comprises 0.02% to 3% by weight of the at least one electrolyte c).

16. A method for improving plant wettability by a reduction in dynamic surface tension, comprising applying the spray liquor of claim 1 to a plant.

17. A method for control and/or abatement of unwanted plant growth, comprising contacting the unwanted plant, or habitat thereof with the spray liquor of claim 1.

18. The method of claim 17, wherein the spray liquor further comprises at least one water-insoluble active ingredient d).

* * * * *